United States Patent
Stump

(10) Patent No.: US 10,451,752 B2
(45) Date of Patent: Oct. 22, 2019

(54) LONG DISTANCE SIMULATED RADIATION DETECTOR

(71) Applicant: Texas Tech University System, Lubbock, TX (US)

(72) Inventor: Robert Stump, El Paso, TX (US)

(73) Assignee: Texas Tech University System, Lubbock, TX (US)

( * ) Notice: Subject to any disclaimer, the term of this patent is extended or adjusted under 35 U.S.C. 154(b) by 0 days.

(21) Appl. No.: 16/150,481

(22) Filed: Oct. 3, 2018

(65) Prior Publication Data

US 2019/0101658 A1      Apr. 4, 2019

Related U.S. Application Data

(60) Provisional application No. 62/567,494, filed on Oct. 3, 2017.

(51) Int. Cl.
| | | |
|---|---|---|
| *G01T 7/00* | (2006.01) | |
| *G01T 3/00* | (2006.01) | |
| *G09B 9/00* | (2006.01) | |
| *G01S 19/01* | (2010.01) | |
| *G01T 1/02* | (2006.01) | |
| *G09B 23/20* | (2006.01) | |

(52) U.S. Cl.
CPC ............... *G01T 7/00* (2013.01); *G01S 19/01* (2013.01); *G01T 1/02* (2013.01); *G01T 3/00* (2013.01); *G09B 9/00* (2013.01); *G09B 23/20* (2013.01)

(58) Field of Classification Search
CPC ... G01S 19/01; G01T 1/02; G01T 3/00; G01T 7/00; G09B 9/00
See application file for complete search history.

(56) References Cited

U.S. PATENT DOCUMENTS

| | | | |
|---|---|---|---|
| 4,500,295 A | 2/1985 | Insinger, III et al. | |
| 5,722,835 A | 3/1998 | Pike | |
| 8,541,749 B2 | 9/2013 | Yoder et al. | |
| 8,794,973 B2 | 8/2014 | Darois et al. | |
| 9,230,450 B1 | 1/2016 | Bergeron | |
| 2006/0237648 A1* | 10/2006 | Bushberg | G01T 1/02 250/336.1 |
| 2008/0111073 A1 | 5/2008 | Bushberg | |
| 2008/0129504 A1 | 6/2008 | Killian et al. | |
| 2008/0241805 A1 | 10/2008 | Schantz | |
| 2009/0224176 A1 | 9/2009 | Patel | |
| 2009/0263771 A1* | 10/2009 | Darois | G09B 9/00 434/218 |
| 2012/0024044 A1 | 2/2012 | Tao et al. | |
| 2014/0167953 A1 | 6/2014 | Dunlop et al. | |
| 2014/0323157 A1 | 10/2014 | Drukier et al. | |
| 2015/0338525 A1 | 11/2015 | Valentino et al. | |

* cited by examiner

*Primary Examiner* — Mark R Gaworecki
(74) *Attorney, Agent, or Firm* — Kevin Soules; Luis M. Ortiz; Kermit D. Lopez

(57) ABSTRACT

A system, method, and apparatus for simulating the detection of radiation comprise at least one simulated radioactive source, a simulated radiation detector, and an emulating module configured to simulate a detection level for the at least one simulated radioactive source according to a radiation level associated with the simulated radioactive source, wherein the simulated detection level is provided on the simulated radiation detector.

18 Claims, 17 Drawing Sheets

LONG DISTANCE SIMULATED RADIATION DETECTOR

CROSS REFERENCE TO RELATED PATENT APPLICATIONS

This patent application claims the priority and benefit under 35 U.S.C. § 119(e) of U.S. Provisional Patent Application Ser. No. 62/567,494, filed Oct. 3, 2017, entitled "LONG DISTANCE SIMULATED RADIATION DETECTOR." U.S. Provisional Patent Application Ser. No. 62/567,494 is herein incorporated by reference in its entirety.

TECHNICAL FIELD

Embodiments are generally related to the field of detection devices. Embodiments are also related to the field of simulations. Embodiments are further related to the field of RFID technology and GPS technology. Embodiments are also related to methods, systems, and devices for simulating detection of radioactive sources. Embodiments are further related to methods, systems, and apparatuses for simulating radioactive sources using RFID and GPS technology for training exercises.

BACKGROUND

Training for infrequent, high-risk events is difficult, but also of critical importance. Such events include nuclear or radiological incidents resulting from terrorism, industrial accidents, military action, etc. In the event of a nuclear or radiological incident, a significant factor in reducing the human toll is the ability of trained personnel to respond. Training provides such personnel experience so that they can quickly and competently act in the case of an actual emergency.

Prior art methods for radiation incident training require the use of actual live radiation sources. In such prior art training exercises, live radioactive sources are disposed in an environment, and then students are required to find them, using prescribed methods and equipment. While these activities are excellent training, they also require exposure to radioactive sources. It is well documented that even low levels of radiation exposure is not completely safe. This is reflected in the "as low as reasonably achievable" (ALARA) philosophy applied, as a general principle, in all live radioactive source applications.

Further, actual radioactive source detection (i.e. radiation) is inversely proportional to the distance from the source squared. Thus, in the case of a live radioactive source, as the detector moves closer to a source, the detection rate increases dramatically. As the trainee gets closer to the live radioactive source, the exercise becomes more dangerous. In addition, many prior art methods fail to accurately model the detection rate change as a function of distance.

Accordingly, there is a need in the art for methods and systems that can be used to accurately simulate radioactive source detection without using actual radioactive material.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for high-risk event training.

It is another aspect of the disclosed embodiments to provide a method, system, and apparatus for detecting a simulated radioactive source.

It is another aspect of the disclosed embodiments to provide methods, systems, and apparatuses for simulating radioactive sources using wireless technology, GPS technology, and/or RFID technology.

It is another aspect of the disclosed embodiments to provide methods, systems, and apparatuses for accurately simulating the release of radiation or radioactive fallout wherein the simulation is updated, and changes over time, in a manner that simulates a real world event.

It is another aspect of the disclosed embodiments to provide methods, systems, and apparatuses for accurately simulating radiation levels according to the distance from the simulated radioactive source, using GPS and/or RFID technology, for training exercises.

In an embodiment, a system for simulating the detection of radiation comprises at least one simulated radioactive source, a simulated radiation detector, and an emulating module configured to simulate a detection level for the at least one simulated radioactive source according to a radiation level associated with the simulated radioactive source, wherein the simulated detection level is provided on the simulated radiation detector.

In an embodiment, the emulating module adjusts the detection level according to a distance between the simulated radioactive source and the simulated radiation detector. In an embodiment, distance between the simulated radioactive source and the simulated radiation detector is determined according to a signal field strength of a signal provided by the simulated radioactive source.

In an embodiment, the simulated radioactive source comprises at least one of: a GPS enabled RFID tag, an RFID tag, and a GPS enabled device. In an embodiment, the simulated radiation detector comprises: a simulated radiation detector housing, a control board configured in the housing, a GPS module connected to the control board, an RFID module connected to the control board, a transceiver connected to the control board wherein the transceiver is configured to provide one of one-way and two-way communication between the simulated radiation detector and a central computer, at least one simulated radiation gauge operably connected to the emulating module, and at least one simulated radiation sound producing device operably connected to the emulating module.

In an embodiment, the at least one GPS enabled RFID tag is preprogrammed with a simulated radiation level, the simulated radiation level being provided to the emulating module. In an embodiment, the emulating module provides an output indicative of the simulated radiation level associated with the at least one GPS enabled RFID tag according to at least one of an original simulated radiation level associated with the GPS enabled RFID tag, a half-life associated with the simulated radioactive source, a time of decay associated with the simulated radioactive source, and a distance between the GPS enabled RFID tag and the simulated radiation detector.

In an embodiment, a location of the at least one simulated radiation source is provided to the simulated radiation detector. The simulated radiation detector housing can comprise a radiation survey meter. The emulating module can comprise a circuit comprising: an RFID detector device, logic to process signals received from the at least one simulated radioactive source, and an output to emulate the detection of a radioactive source.

In another embodiment a radiation detection training method comprises generating a model of an event, recording a location of at least one simulated radiation detector, determining a simulated radiation level for the location of the at least one simulated radiation detector, and providing an output signal simulating the simulated radiation level at the location of the simulated radiation detector. Generating a model of an event further comprises assigning one or more simulation parameters of the event.

The simulated parameters can comprise at least one of: a location, a type of nuclear event, a type of radioactive material, an amount of radioactive material, a time of a training exercise, a size of the nuclear event, nuclear decay characteristics of various isotopes, at least one shielded location and its shielding factor, one or more weather characteristics, a model of fallout characteristics, a model of high lethality locations, a model of shielding for various geographic characteristics, a model of shielding for various structural objects, a model of shielding for various physical objects, an evolution of characteristics with time, and a map of event variables for each location.

In an embodiment, the output further comprises: at least one simulated radiation reading provided on at least one simulated radiation gauge and at least one simulated auditory response provided on at least one simulated radiation sound producing device.

In yet another embodiment a system for simulating the detection of radiation comprises at least one simulated radioactive source, a simulated radiation detector portal, and an emulating module for receiving signals from the at least one simulated radioactive source and providing an output signal simulating detection of a radioactive source. The at least one simulated radioactive source comprises an RFID tag preprogrammed with a simulated radiation level, the simulated radiation level being provided to the emulating module. The emulating module provides an output indicative of the simulated radiation level associated with the at least one RFID tag. The simulated radiation detector portal comprises a simulated radiation detector gate, at least one simulated radiation gauge operably connected to the emulating module, and at least one simulated radiation sound producing device operably connected to the emulating module.

In an embodiment, the system further comprises a processing system configured to model a radiation distribution event and provide a training exercise for a predefined map and at least one simulated radiation detector comprising a control board and at least one of: a GPS enabled device, an RFID enabled device, and a transceiver, wherein a location of the at least one simulated radiation detector is provided to the central computer and a simulated radiation level is provided to the at least one simulated radiation detector according to the model of radiation distribution and the location of the at least one simulated radiation detector. The processing system can comprise one of a central computer system, and a computing system configured in the at least one simulated radiation detector.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
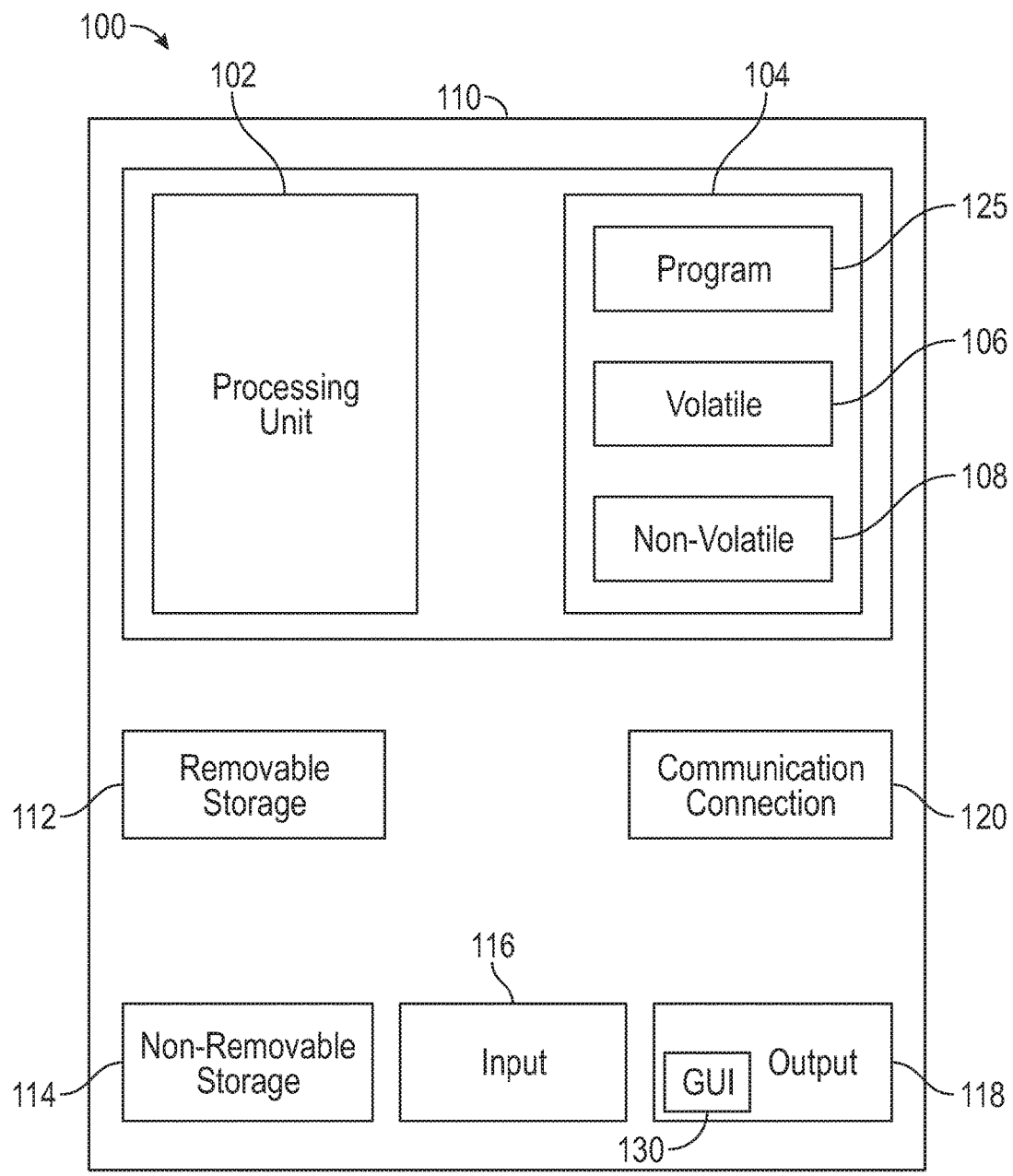
FIG. 1 depicts a block diagram of a computer system which is implemented in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
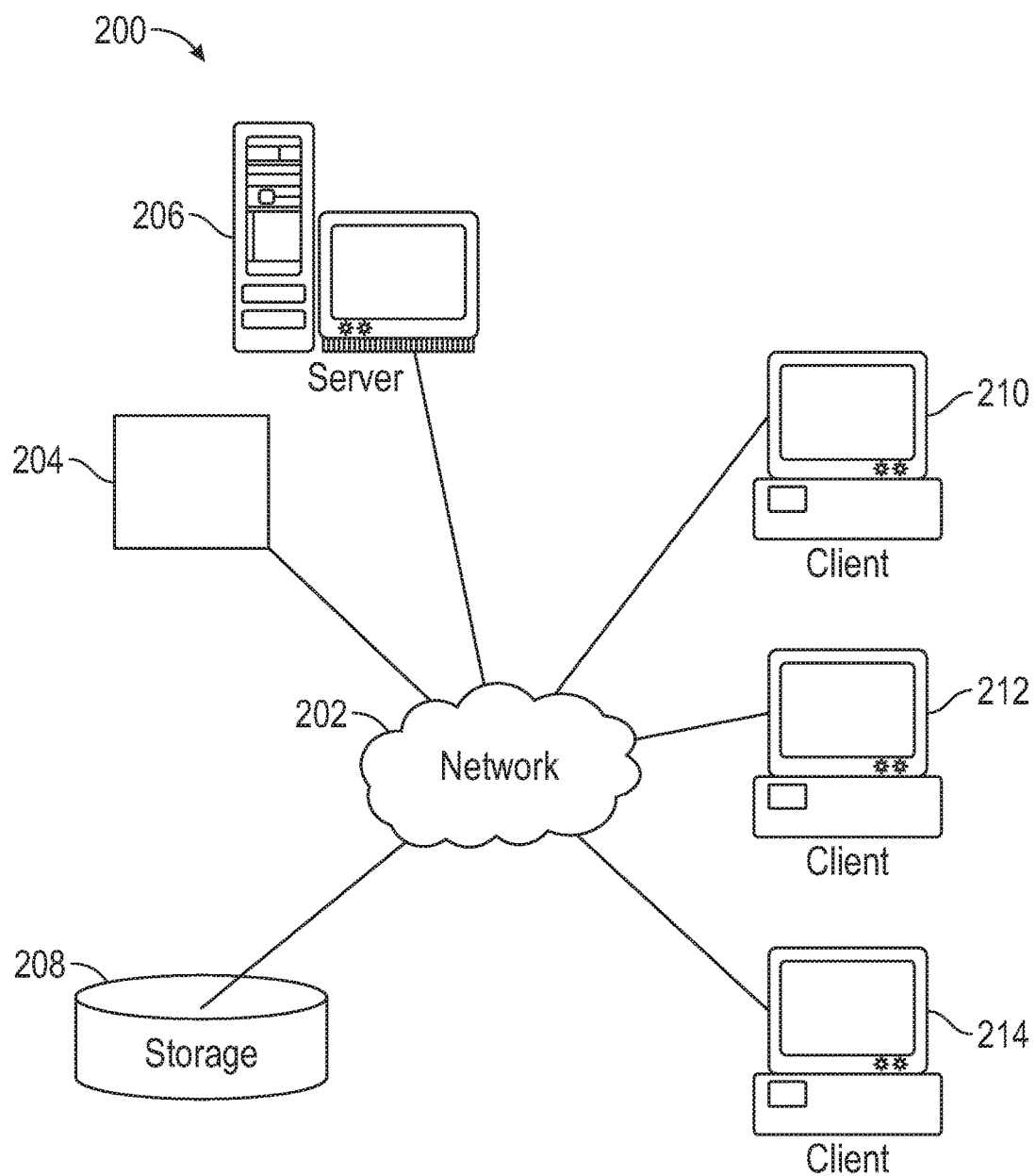
FIG. 2 depicts a graphical representation of a network of data-processing devices in which aspects of the present embodiments may be implemented.
Figure 3:
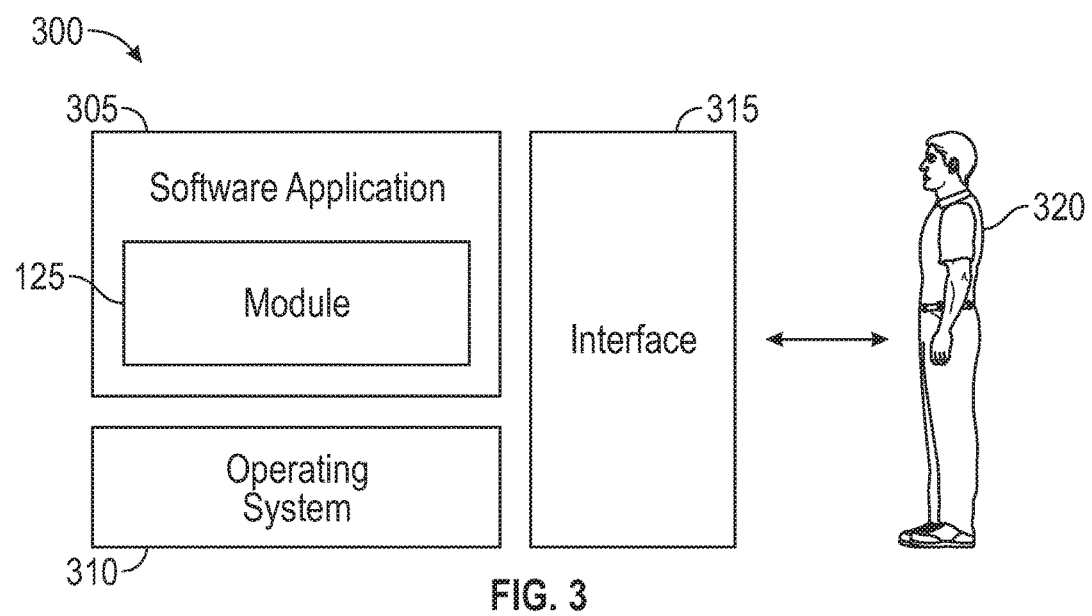
FIG. 3 depicts a computer software system for directing the operation of the data-processing system depicted in FIG. 1, in accordance with an embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, remote sensors, detection devices, hand-held devices, multi-function devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other such devices such as mobile phones, smartphones, sensors, detection devices, and the like in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more RFID and/or GPS enabled devices 204, servers 206, and storage 208. Network 202 is a medium that can be used to provide communications links between various devices and computers connected together within a networked data processing system such as computer system 100. Network 202 may include connections such as wired communication links, wireless communication links of various types, fiber optic cables, quantum, or quantum encryption, or quantum teleportation networks, etc. Network 202 can communicate with one or more servers 206, one or more external devices such as RFID and/or GPS enabled device 204, and a memory storage unit such as, for example, memory or database 208. It should be understood that RFID and/or GPS enabled device 204 may be embodied as a detector device, microcontroller, controller, receiver, transceiver, or other such device.

In the depicted example, RFID and/or GPS enabled device 204, server 206, and clients 210, 212, and 214 connect to network 202 along with storage unit 208. Clients 210, 212, and 214 may be, for example, personal computers or network computers, handheld devices, mobile devices, tablet devices, smartphones, personal digital assistants, microcontrollers, recording devices, MFDs, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and RFID and/or GPS enabled device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices, multi-processor systems, printers, copiers, fax machines, multi-function devices, data networks, microprocessor-based or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

In the embodiments disclosed herein, radio-frequency identification (RFID) tags and/or GPS enabled devices can be used to emulate radioactive sources. It should be understood that in some embodiments, the GPS enabled devices can be used with RFID tags, and in some embodiments, the RFID tags can be used without the GPS enabled devices. In other embodiments RFID and GPS related equipment can be used in concert (and even housed in a single unit) to simulate a radioactive source. As such, reference to an RFID tag or RFID enabled device, as used herein, should be understood to include any of the aforementioned embodiments of a simulated radioactive source including a standalone GPS device, a standalone RFID tag, a standalone transceiver, or some combination thereof.

The RFID tags (or other simulated sources) can be distributed in a test environment. A handheld device embodied, for example, as a simulated cold war radiation survey meter, or other, more modern radiation detector equipment, can simulate detection of radiation using an RFID reader, and/or GPS device, and/or radio transceiver, and/or a microcomputer.

Figure 6:
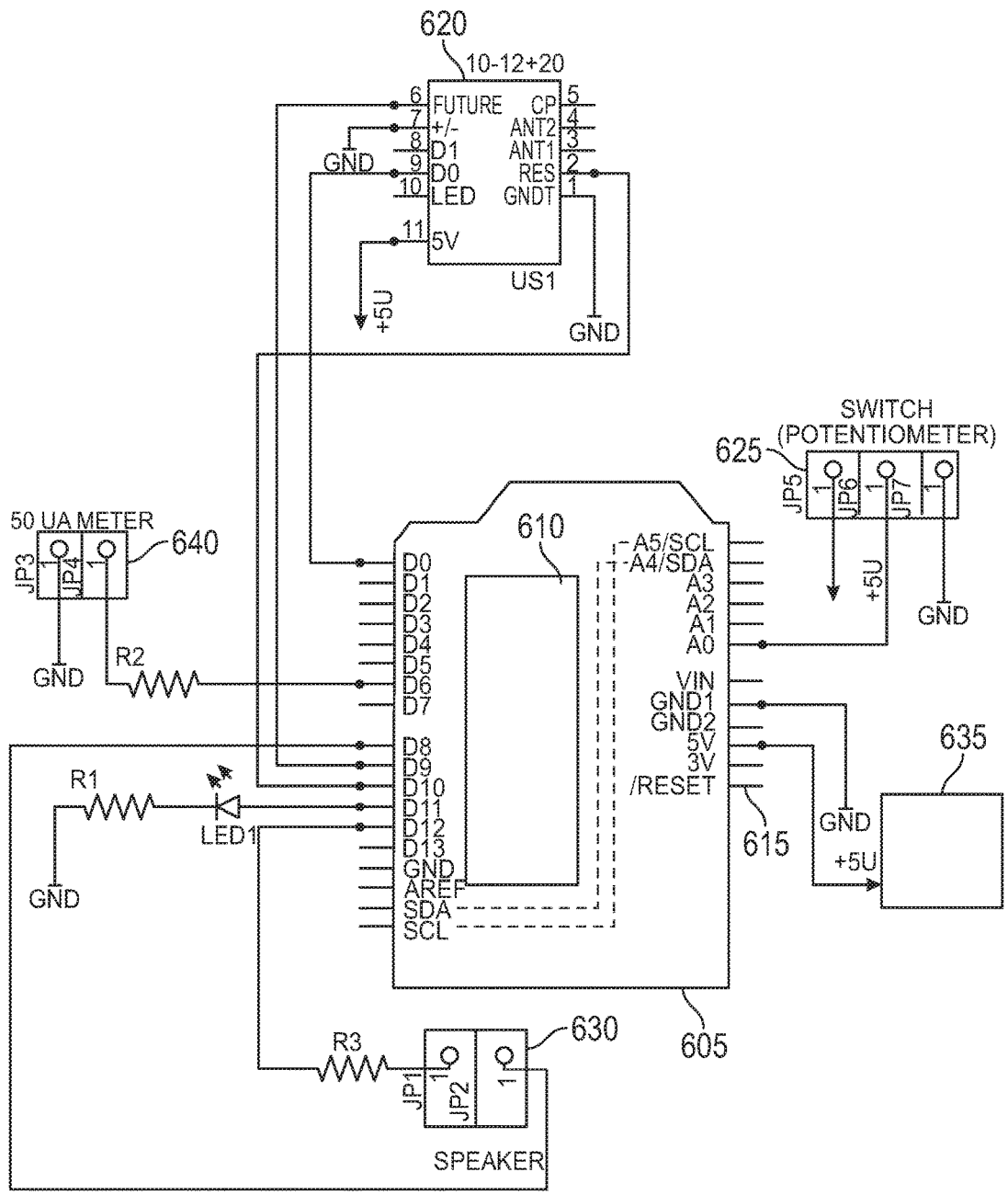
FIG. 6 depicts a circuit diagram of a detector system in accordance with the disclosed embodiments.

Each RFID tag can be assigned a unique identifier, which can be associated with a pre-programmed level of radiation. The simulated radiation survey meter can produce meter readings and/or auditory data (e.g., radiation detector "clicks") for each RFID tag indicative of a simulated radiation level associated with the RFID tag. An exemplary electronic circuit, which may serve as an emulating module, associated with the embodiments is illustrated in FIG. 6. It should be appreciated that the simulated radiation survey meter may include hardware, as illustrated in FIG. 6, comprising a circuit designed to incorporate an RFID detector device, logic to process signals received from the RFID tags, and an output to emulate the detection of a radioactive source. Alternatively, or in addition, the simulated radiation survey meter may include a computer system or handheld device with processor readable instructions which can accept input from, or be embodied as, an RFID reader, process the instructions, and control outputs to a gauge and/or sound producing device (e.g., earphone, headphone, loudspeaker, etc.) intended to simulate the output of the detection of a radioactive source.

The simulated radiation survey meter can thus readily be used by trainees to find and identify RFID tags corresponding to various predefined levels of radiation. Multiple RFID tags can be used, representing near background radiation, up to lethal radiation doses. RFID tags can be hidden in moulage, under the skin of mannequins, on live human actors, or in other places within the training environment, without interfering with the RFID signal.

Figure 4:
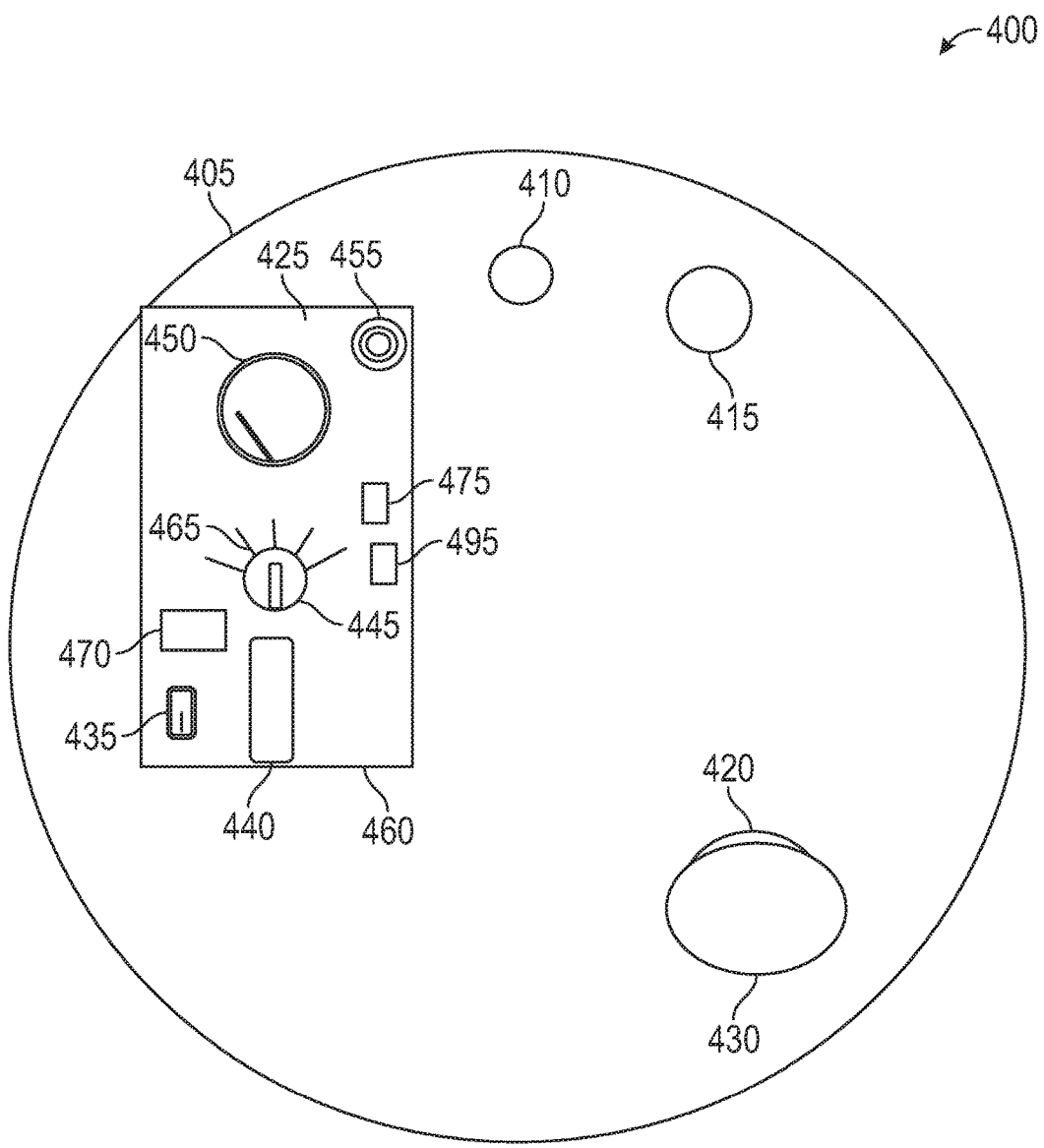
FIG. 4 depicts a system for simulating radiation detection in accordance with the disclosed embodiments.

FIG. 4 illustrates a block diagram of a simulated radiation detection system 400 in accordance with the disclosed embodiments. A test area 405 can comprise any environment, but may preferably be a hospital or area of a hospital, an open outdoor space, a triage center, a training building or venue, or other such environment. The test area 405 can be selected to match the likely real-world working environment of a trainee. For example, if radiation simulation detection training is being provided for medical staff, the environment may preferably be a hospital. In certain applications, the environment may relate to radiopharmacy and/or radiopharmacy applications and environments. If the radiation simulation detection training is being provided for military personnel, the test area may include a simulated detonation zone, urban environment, sub-urban environment, or other such combat environment.

The test area 405 can be pre-populated with one or more simulated radiation sources, such as simulated radiation sources 410, 415, and 420. The simulated radiation sources 410, 415, and 420 comprise RFID tags, GPS devices, other radio wave devices (i.e. transceivers), or some combination thereof. It should be understood that any number of simulated radiation sources may be used, and the use of three sources in FIG. 4 and throughout this disclosure, is meant to be exemplary. In some cases, it may be desirable to include a large number of radiation sources, so that a team of trainees can work together to identify the sources. In other cases, only a single source, or a limited number of sources may be desirable where basic operation of radiation detectors, and/or searching protocols, are the focus of the training exercise.

The simulated radiation sources 410, 415, and 420 (e.g. RFID tags, transceivers, GPS devices, etc.) can be distributed throughout test area 405. For example, the simulated radiation sources 410, 415, and 420 can be hidden in the test area, attached to objects in the test area, hidden in the clothes or otherwise attached to live actors or mannequins in the test area 405, and/or otherwise placed in the test area 405.

The RFID tags, GPS devices, or other such radio transmitter and receiver devices disclosed herein, can include an integrated circuit used to store and process information, modulate a radio-frequency (RF) signal, and harness power from a reader signal. The RFID tags can include an antenna for receiving and transmitting a signal. Tag information can be stored in on-board memory associated with the tag and/or with the tag reader. In general, simulated radiation sources 410, 415, and 420 can thus be embodied as RFID tags, GPS enabled devices, or other such transceivers.

Figure 5:
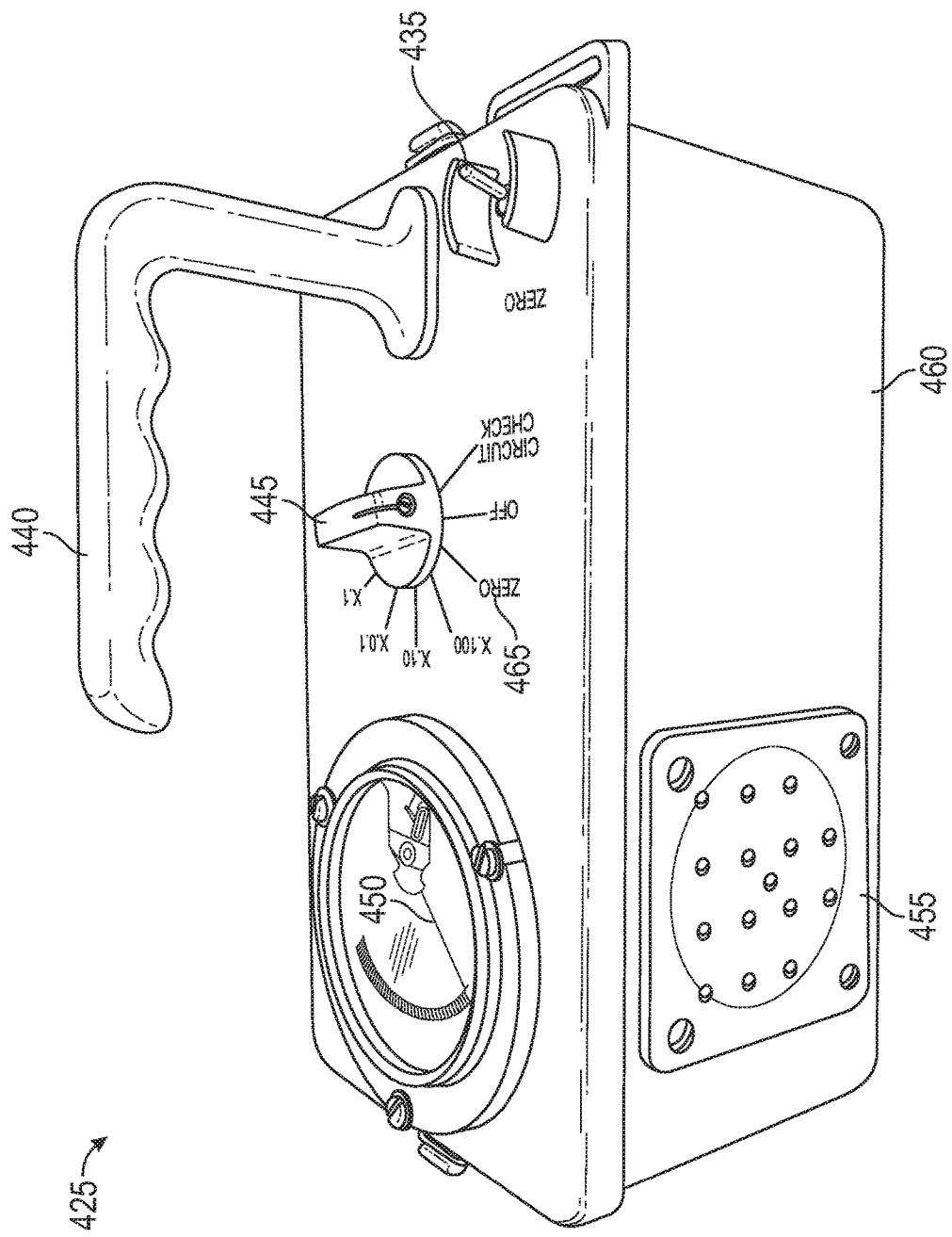
FIG. 5 depicts an exemplary simulated radiation detector in accordance with the disclosed embodiments.

A simulated radiation detector 425 can be provided to simulation trainees. The simulated radiation detector can generally be configured to emulate the aesthetic and functional qualities of an operational radiation detector. FIG. 5 provides an illustration of one such simulated radiation detector 425. In the embodiment of the simulated radiation detector 425 provided in FIG. 5, the detector is configured to emulate a radiation survey meter. It should be understood that, in other embodiments, the aesthetic qualities of the simulated radiation detector can be selected to match the operable radiation detector that the trainee is likely to use in a live source scenario. For example, in other embodiments simulated radiation detectors can comprise simulations of Geiger counters, radiation survey meters, RIID (radio-isotope identification devices), dosimeters, personal dosimeters, radiation pagers, scintillation counters, radiation portals, alpha and/or beta and/or gamma and/or neutron detectors, ionization detectors, radiation portals, NaI radiation detectors, solid state radiation detectors, vehicle mounted radiation detectors, and remote radiation sensing stations etc.

The simulated radiation detector 425 can include a two-way radio transmitter-receiver (e.g. RFID reader 470) that sends signals to the RFID tag serving as the simulated radiation sources 410, 415, and 420. The RFID tags 410, 415, and 420 provide response signals. In the embodiments disclosed herein, the RFID tags 410, 415, and 420 can provide a signal indicative of a simulated radiation level that has been assigned to the respective tag and programmed into the tag. In an embodiment, different tags can include or represent different radiation levels ranging from background level radiation, to fully lethal levels of radiation and beyond. The RFID tags can be preprogrammed with a simulated radiation level, where the simulated radiation level is provided in the signal received by the emulating module.

In some embodiments, the RFID tag identifier (i.e. the tag number) can be correlated with a simulated radiation level. The RFID tag identifier can be used to determine the perceived level of simulated radiation by referencing a look-up table that provides a simulated radiation level for each RFID tag number. The look-up table can be stored in memory on board, or associated with, the simulated radiation detector or a central computer where the data is accessible via network connections between the computer, simulated radiation detectors, and/or simulated sources.

In addition, the simulated radiation detector 425 can be configured to measure the signal strength (e.g. the signal power) provided from one or more of the RFID tags 410, 415, and 420. The signal strength can be used to approximate the distance to the RFID tag, in order to simulate the inverse distance squared relationship of real radioactive sources as described in greater detail herein.

In an embodiment a simulated calibration radioactive source 475 comprising an RFID tag and/or GPS device can be included on the simulated radiation detector 425. Operational radiation detectors are often equipped with a low-level radiation calibration source on the side. Thus, in order to add realism to the training exercise, the simulated calibration radioactive source 475 can be formed on the simulated radiation detector 425. The trainee can use the signal from the simulated calibration radioactive source to verify the "proper operation" of the simulated radiation detector.

In the disclosed embodiments, one or more of the simulated radiation sources 410, 415, and 420 can comprise active RFID tags, battery-assisted passive RFID tags, and/or passive RFID tags. Active RFID tags include a battery. The battery provides power to a transmitter that intermittently transmits a signal. In the embodiments disclosed herein, the transmitted signal is a simulated radiation level assigned to the tag.

In other embodiments, a battery-assisted passive (BAP) RFID tag can be used. BAPS have an on-board battery. The transmitter on the BAP RFID tag is activated in the presence of an RFID reader. When activated, the transmitter sends a signal to the reader corresponding to the simulated radiation level assigned to the tag.

In another embodiment, the simulated radiation source can comprise a passive RFID tag. The simulated radioactive source comprising a passive RFID tag collects the radio energy transmitted by the reader. The energy is used to power a transmitter that sends a signal to the reader corresponding to the simulated radiation level assigned to the tag.

The simulated radioactive sources 410, 415, and 420, comprising RFID tags, GPS enabled devices, transceivers, or a combination thereof, may include memory so that data can be written to the tag. Such data may include a tag ID and/or a simulated radiation level associated with the tag. It should be understood that in certain embodiments the tag ID associated with a tag may correlate to a simulated radiation source level stored in the reader and/or microcontroller associated with the simulated detector, or in another associated computing system. RFID tags can have individual serial numbers, which allows the simulated radiation detector 425 to discriminate among multiple tags. The simulated detector can read nearby tags one at a time or simultaneously.

RFID tags, such as simulated radioactive sources 410, 415, and 420, can thus be preprogrammed to emulate a desired radiation level by transmitting a signal to a nearby detector. RFID tags have the advantage of being small and therefore easy to hide. RFID tags are also capable of transmitting a signal through certain media. For example, the disclosed RFID tags may be hidden in clothes, under moulage 430, and in, or around, furniture or other such fixtures in the environment 405.

Returning to the simulated radiation detector 425, in an embodiment the simulated radiation detector 425 can include an on/off switch 435 and handle 440. The radiation detector can include a selector switch 445 that provides sensitivity settings 465 including a "Zero" setting similar to an operating radiation survey meter. A "circuit check" setting can functionally operate as a battery test (or power test) of the battery (or other power source) powering the simulated radiation detector 425, but also give the experience of operating a real radiation survey meter. The simulated radiation detector 425 can further comprise a transceiver 495 for communication to/from the simulated radiation detector 425 to a central computer, and to other simulated radiation detectors.

The simulated radiation survey meter 425 further includes a simulated radiation gauge 450 and a simulated radiation detector sound-producing device 455. Sound-producing device 455 may be embodied as earphones, headphones, a loudspeaker, a clicker, or other such device. The simulated radiation gauge 450 and simulated radiation detector sound-producing device 455 can be operably connected to an RFID reader 470, and associated control board or Arduino, contained inside the simulated radiation detector housing 460.

FIG. 5 illustrates an exemplary embodiment of a radiation detector 425, configured in a style intended to replicate a cold war radiation survey meter. Note that the reference numerals in FIG. 5 correlate with like features illustrated in FIG. 4. Also note, in other embodiments, the style of the radiation detector can take other forms. The simulated radiation detector 425, on/off switch 435, and handle 440 are positioned on the top of the detector housing 460. The radiation detector 425 includes selector switch 445 that provides sensitivity settings 465 including a "Zero," setting similar to an operating radiation survey meter. The simulated radiation survey meter 425 has a simulated radiation gauge 450 and a simulated radiation detector speaker 455. The detector housing 460 is preferably configured to internally house an RFID reader 470, and associated control board or Arduino which are connected to, and used to control, the simulated survey meter 425, on/off switch 435, selector switch 445, speaker 455, and any other associated electronics.

Figure 10:
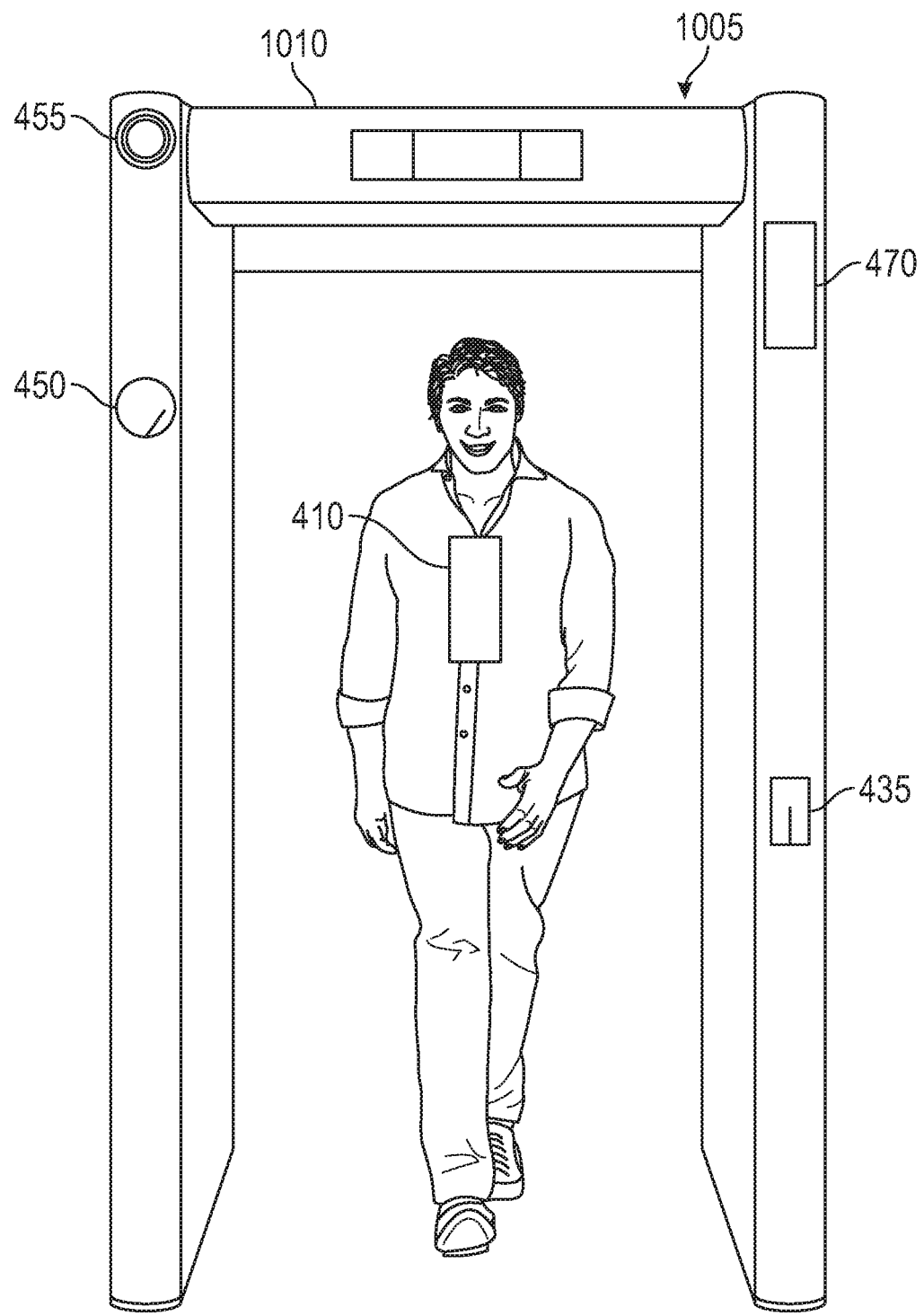
FIG. 10 depicts a diagram of a simulated radiation detecting portal in accordance with the disclosed embodiments.

FIG. 10 illustrates an embodiment of a simulated radiation detector where the simulated radiation detector is embodied as a radiation portal. In the case of a disaster event (e.g. a so-called "dirty bomb" detonation) a large number of people may be exposed to dangerous levels of radiation. In such circumstances, screening individuals for radiation exposure becomes impractical with standard hand held detectors. Thus, radiation portals, which have an appearance similar to standard metal detectors, can be used for radiation exposure screening. In a real-world implementation, people, animals, or other items potentially exposed to radiation can pass through the radiation portal, which is equipped to determine the level of radiation exposure the individual experienced. The radiation level can be used in a triage protocol to identify those people that require immediate treatment from high exposure levels, and those that have little or no exposure.

The simulated radiation portal 1005 illustrated in FIG. 10 includes some or all of the functional elements of a simulated radiation detector disclosed in other embodiments. However, the elements are housed in an arch-like housing in order to emulate the aesthetic and functional characteristics of a live radiation portal. During a simulation, one or more actors, trainees, animals, or other objects can have one or more RFID and/or GPS device on their person. Others can have no RFID and/or GPS device. When the individuals pass through the simulated radiation portal, an RFID receiver and/or GPS device can receive a signal from the RFID and/or GPS device on the individual or object. The simulated radiation portal can provide audio feedback indicative of the simulated radiation level associated with the simulated radiation source, and can include a gauge indicative of the simulated radiation level. A color-coded lights system 1010 can be included with various light colors indicating different levels of exposure.

In order to properly simulate a true radiation portal, RFID and/or GPS devices can be selected with a desired range, so that the RFID and/or GPS reader does not false read tags that are not passing through the simulated radiation portal.

An exemplary electronic circuit 600, or emulator module, associated with the embodiments, is illustrated in FIG. 6. It should be appreciated that the simulated radiation survey meter can include hardware as illustrated in FIG. 6 comprising a circuit designed to incorporate an RFID detector device 470, logic to process signals received from the RFID tags, GPS devices, radio signals, and other such data, and an output to emulate the detection of a radioactive source. The electronic circuit 600 can be configured in the housing 465 illustrated in FIG. 4.

As illustrated in FIG. 6, the system can include a control chip 605. The control chip 605 (or control board) can comprise an Arduino, or other such microcontroller. Control board 605 can include one or more microprocessors 610. The control board 605 can include one or more digital and/or analog input/output (I/O) pins 615 that are configured to interface with other circuits, and circuit elements. The control board 605 can include communications interfaces, including, but not limited to, a Universal Serial Bus (USB). Other communication interfaces can include transceivers, Bluetooth, cellphone, or other communication devices. The communication interfaces are used for communication with a computer, such as a central computer system, other simulated radiation detectors, simulated radiation sources, and/or other external computing devices. In many cases the communications interface provides a means for transmitting programs and other data to and from the control board 605.

The control board 605 can be programmed to perform specific tasks or functions. In the embodiments disclosed herein, the control board 605 can be programmed to control and/or serve as an RFID reader. In some embodiments an RFID board 620 can serve as the RFID reader 470. In other embodiments, this functionality can be integrated in control board 605. Likewise, the control board 605 can be programmed to control and/or serve as a GPS receiver. In some embodiments, a GPS receiver can be an integrated circuit board connected to the control board. In other embodiments, this functionality can also be integrated in control board 605.

In addition, the control board 605 includes a switch 625 that can comprise, or otherwise be connected to, switch 435. The control board further controls meter 640 which can comprise, or otherwise be connected to, simulated radiation meter 450. Likewise, speaker 630 is controlled by control board 605 and provides auditory clicks, or other auditory feedback, to simulate the response of an operational radiation detector. In certain embodiments, speaker 630 is embodied as speaker 455.

The control board 605 is powered by a power source 635. The power source can comprise a connection to a hardwired power source such as a wall socket, or can comprise a battery that is included in the detector housing 450. In total, the simulated RFID detection circuitry, or emulator module 600, is configured to function as a simulated radioactive source detector and or as an event simulator.

Alternatively, or in addition, the simulated radiation survey meter can include a computer system or handheld device with processor readable instructions which can accept input from an RFID reader, GPS device, a simulator, or other data, process the instructions, and control outputs to a gauge and/or sound producing device (e.g., earphone, headphone, loudspeaker, etc.) intended to simulate the output of the detection of a radioactive source.

RFID systems require compatible RFID tags and readers. The RFID tags 410, 415, and 420, and RFID reader 470 can be embodied in a number of ways. One such embodiment includes a passive reader active tag system. In this embodiment, the RFID reader formed in the simulated radiation detector housing only receives radio signals from powered tags. The reception range of the reader can be adjusted as desired. In another embodiment, the system includes an active reader, which transmits signals to passive tags, which collect power from the signal and respond in turn. It should be appreciated that the embodiments can comprise short, mid, or long range RFID tags and RFID readers.

During a simulated radiation test exercise, the simulated radiation detector 425 can be swept through a test environment 405. When the reader 470 receives a signal from a tag (e.g. tag 410, 415, and/or 420), the signal is processed to extract the tag information and determine the radiation level assigned to the tag according to the instructions included on control board 605. The control board 605 then activates the simulated radiation gauge to mimic the gauge 450 with an action that would occur if a real radiation source were nearby. The control board 605 also drives the simulated radiation detector sound-producing device 455 to emulate a Geiger counter, or other such auditory indicia, of a nearby radiation source. Generally, the auditory signal or radiation detector "click" frequency increases when the simulated radiation source (embodied as an RFID tag) is near.

Figure 7:
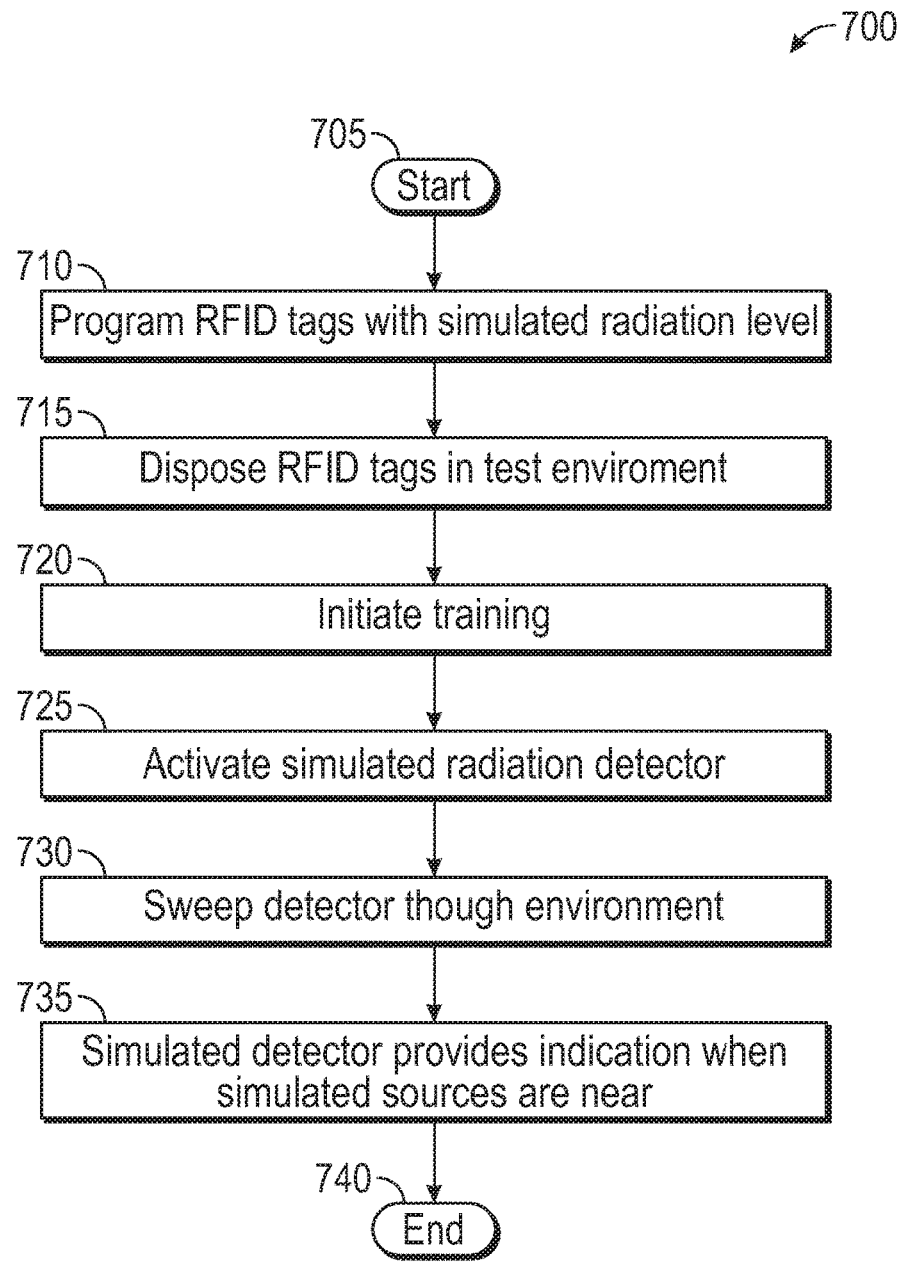
FIG. 7 depicts steps associated with a method for training for the detection of radioactive sources in accordance with the disclosed embodiments.

FIG. 7 illustrates a training method 700 associated with a simulated radioactive source and simulated detector, in accordance with the embodiments disclosed herein. The method begins at step 705. At step 710, one or more simulated radioactive sources comprising RFID tags and/or GPS enabled devices can be pre-programmed to be indicative of a selected radiation level.

At step 715, the simulated sources can then be hidden throughout a training environment. This may include hiding the simulated sources in, or around, furniture, on mannequins or live actors, in moulage, in or around plants or other natural features in the environment, or in any other place in the training environment.

Once the simulated sources are in place, at step 720, the training session can be initiated and the simulated radiation detector can be activated at step 725. One or more of the trainees can be equipped with a simulated radiation detector. Exemplary trainees may include military personnel, medical personnel, disaster preparedness groups, law enforcement, firefighters, EMTs, or other such trainees.

The simulated radiation detectors can be activated at 725 by throwing the power switch. The simulated radiation detectors can then be configured by following a prescribed protocol for initiation which may include a "circuit check." The circuit check can in fact simply test the battery, but may emulate a circuit check on a real radiation detection device. The selector switch can be set to the desired simulated tolerance. Other pre-sweep protocol may also be required to mirror the preparation for a real radiation sweep.

At this point the detection device can be swept through the training environment as shown at step 730. Trainees can be instructed on best practices for operating a live radiation detector in a real disaster scenario, using the simulated radiation detector. The simulated radiation detector can provide auditory and visual feedback when the trainee sweeps the simulated radiation detector close enough to a simulated radiation source as shown at step 735. The detection can accurately simulate the inverse squared relationship between the distance to a radiation source and radiation level by adjusting the simulated auditory and/or visual feedback. This may be repeated until all of the simulated radiation sources are detected and/or the training event ends at step 740.

While the simulated radiation detector and simulated radiation source can take advantage of RFID technology, such technology may be limited because actual radioactive source detection (i.e., radiation) is inversely proportional to the distance from the source squared. In practical terms, this means that as a detector moves closer to a source, the detection frequency rapidly increases. As such, a number of approaches can be employed to properly (or more accurately) simulate the detection frequency increase, experienced in a live radioactive source scenario.

Figure 8:
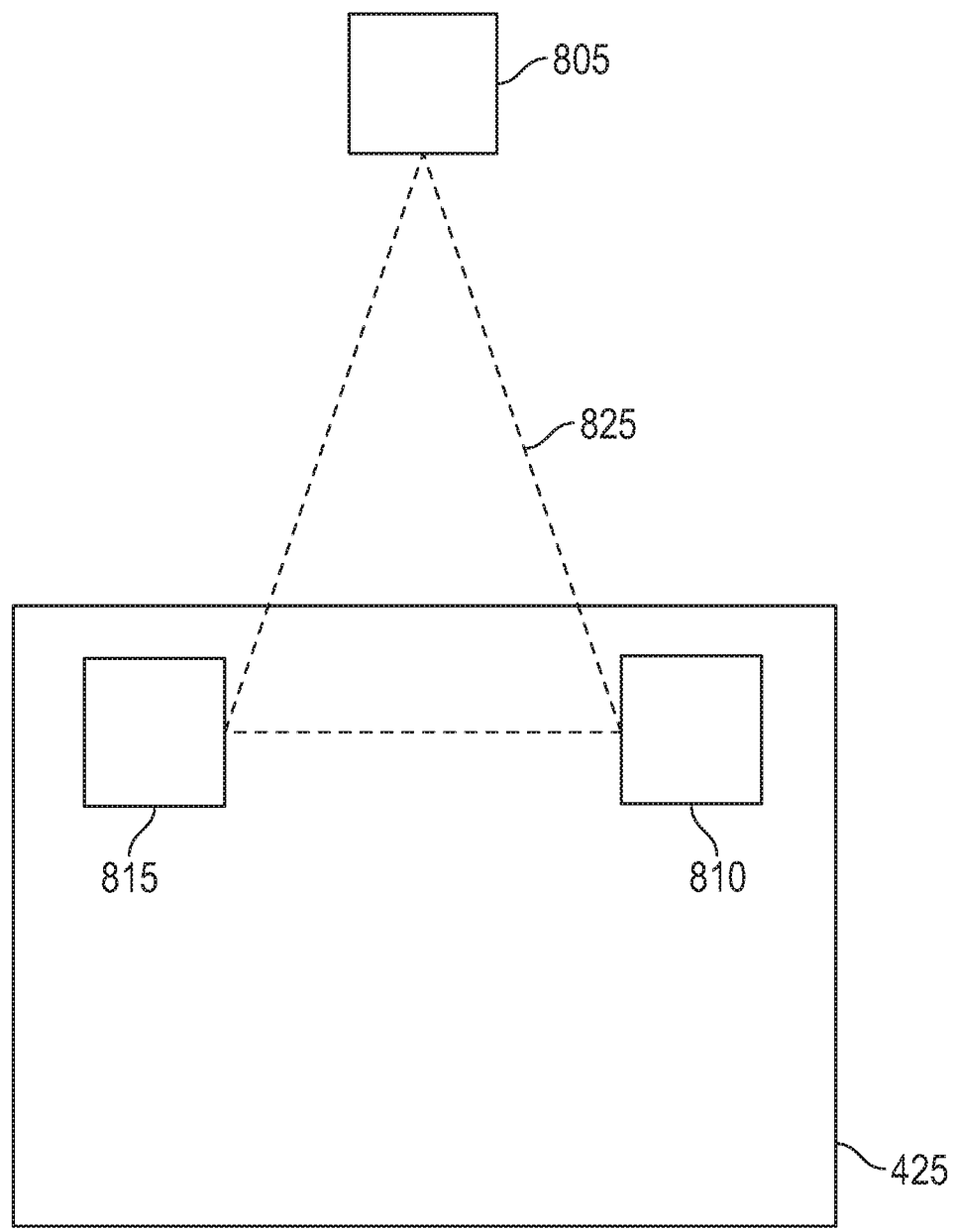
FIG. 8 depicts a block diagram of an exemplary system for determining the distance to a simulated radioactive source in accordance with the disclosed embodiments.

FIG. 8 illustrates certain embodiments, where this relationship can be emulated by configuring the simulated radiation source as a magnet 805. The magnet may serve as a stand-alone simulated source or may be used in conjunction with one or more simulated sources formed as RFID tags and/or GPS enabled devices.

Two compasses, compass 810 and compass 815, can be incorporated in the simulated radiation detector 425, in association with one or more simulated radioactive source comprising a magnet 805. The two compasses 810 and 815 are configured to be a known distance apart. The compasses 810 and 815 can be connected to the control board 605. Using the compass measurements and the respective angles from the line between the compasses to the simulated source 805, the distance to the simulated source can be determined using simple geometric calculations (triangle 825 illustrates the basic geometric shape used in such a calculation) that can be programmed into the control board 605. That distance can then be used by the control board to provide simulated detection of radioactive sources that accurately reflect the distance from the simulated source 805 (i.e. inversely proportional to the distance from the source squared).

Figure 9:
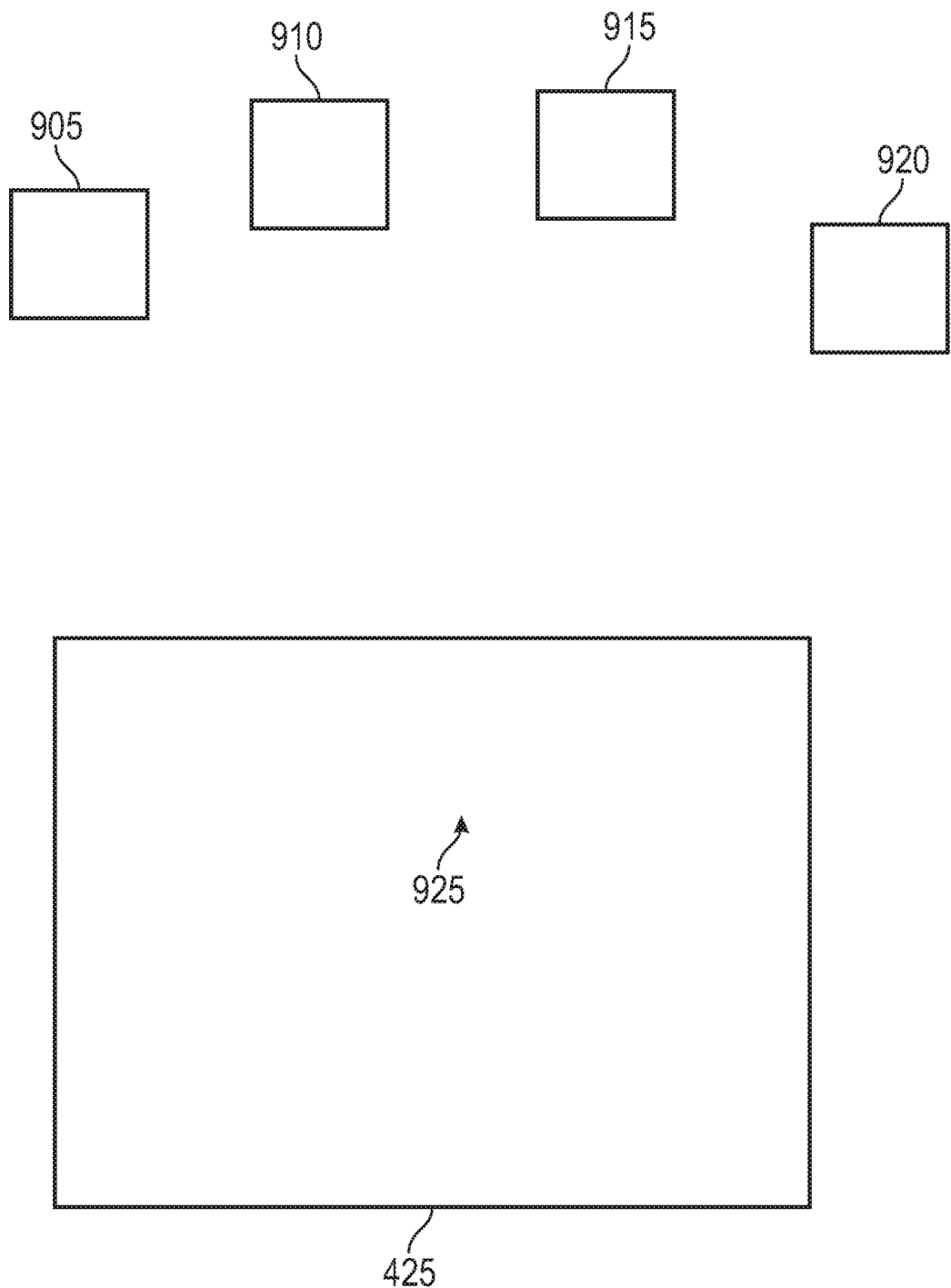
FIG. 9 depicts a block diagram of a system for determining the distance to a simulated radioactive source in accordance with the disclosed embodiments.

In another embodiment, illustrated in FIG. 9, electromagnetic waves can be used to correctly emulate the detection as a function of distance. In one embodiment a source 905 can comprise a standalone infrared (IR) or near infrared (NIR) light source, and/or an IR or NIR source configured with an RFID tag and/or GPS enabled device. In such embodiments, a detector 925 can comprise an IR or NIR detector that is configured to connect with control board 605. In such an embodiment, an arrangement of sources 905, 910, 915, and 920 can comprise IR or NIR light sources that can be distributed in an environment. IR or NIR detectors 925 can be configured on or in the simulated radiation detector 425, preferably in a semicircular configuration, although other arrangements also may be possible. The measured intensity of the IR or NIR light sources can correlate to a specified radioactive source. Incident IR or NIR light on the detector 925 can be used to indicate the direction of the simulated radioactive source.

In other embodiments, the detector 925 may be embodied as an ultraviolet detector, infrared detector, light detector, sound detector, or radio signal detector, and the sources 905-925 can be embodied as ultraviolet sources, infrared source, light sources, sound sources, or radio signal sources respectively. In all such cases, the sources can comprise standalone sources or can comprise a combination or such sources connected to or otherwise associated with RFID tags.

With respect to the radio sources in particular, in such an arrangement, RFID tag radio frequency field strength, the transmitter power needed to identify a tag, or the power of other signals associated with other types of simulated radioactive sources, can be used to estimate the distance between the radiation detector and the RFID tag, so that the inverse distance squared dependence of radiation detection can be modeled.

The embodiments disclosed herein thus provide a framework for mimicking low level, up to absolutely lethal radiation sources, using RFID tags and RFID readers. RFID tags are safe and can be used on human actors without risk. These tags can be hidden within moulage to enhance the learner's experience. The methods and systems eliminate the need to use even low level, potentially dangerous, radioactive isotopes for radiation incident training.

Figure 11:
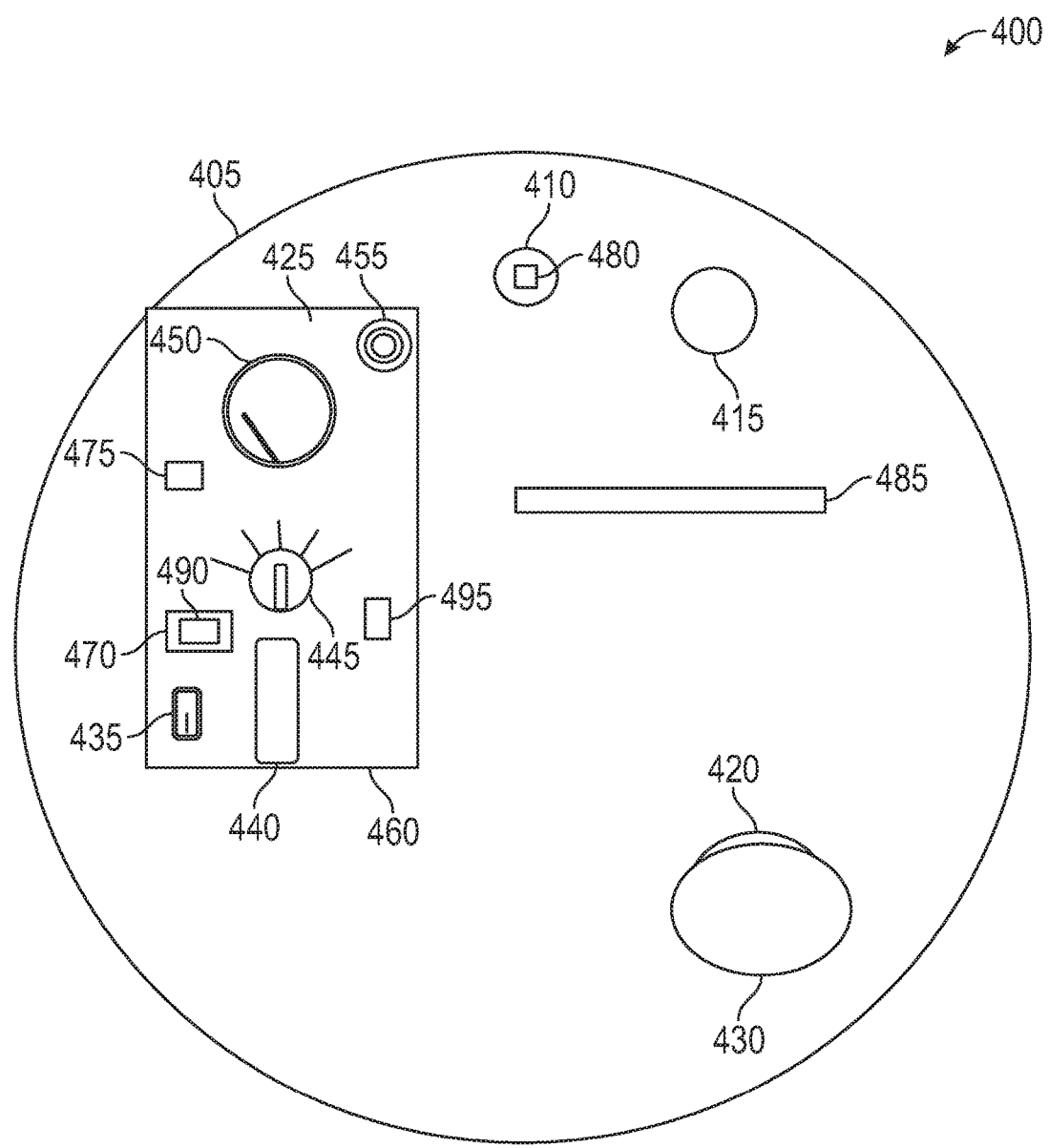
FIG. 11 depicts a block diagram of a system for simulating radiation in accordance with the disclosed embodiments.
Figure 12:
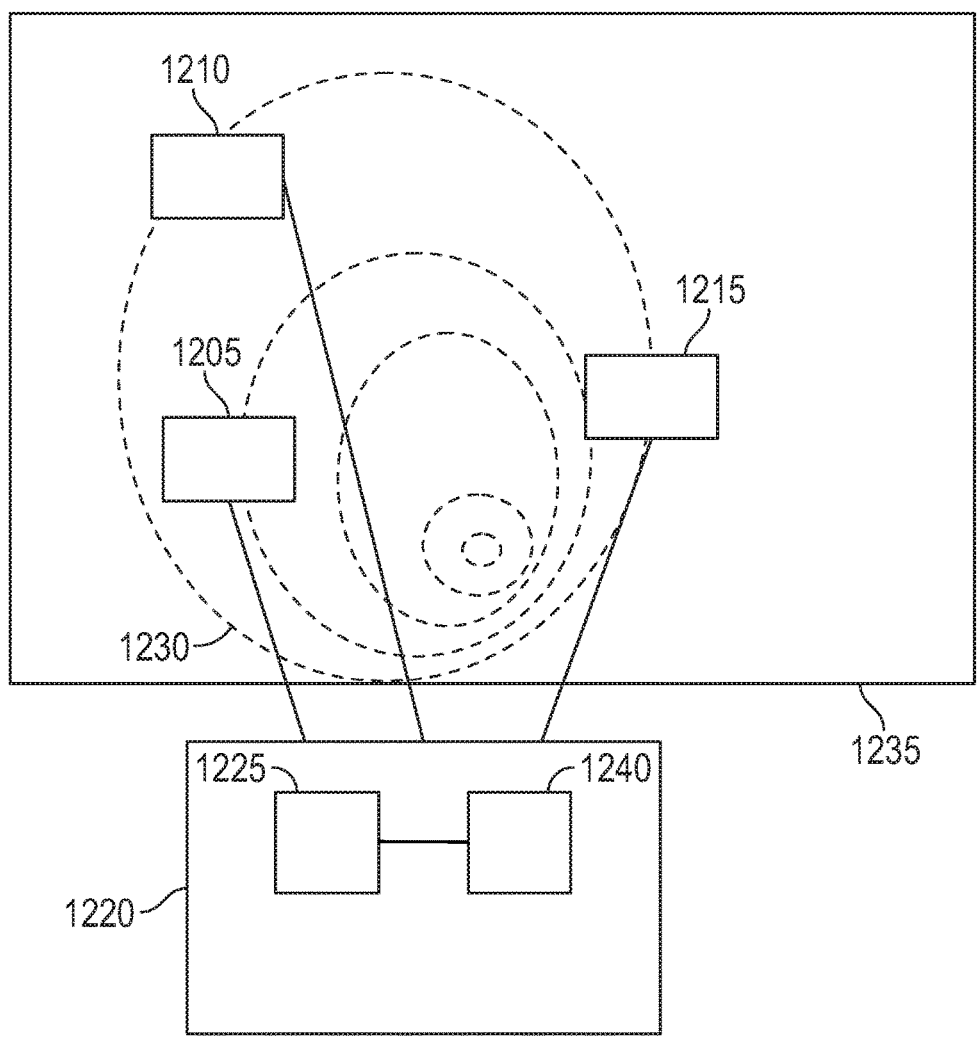
FIG. 12 depicts a block diagram of system for modeling a radioactive source and simulating radiation detection in accordance with the disclosed embodiments.

FIG. 11 illustrates an alternative embodiment of a simulated radiation detection system, wherein GPS systems can be incorporated with the previously described embodiments, to more accurately emulate radioactive detection, both at short range and longer ranges, including ranges of hundreds or thousands of miles if desired. In certain embodiments, the systems and methods can account for the fact that radioactive signal strength is inversely proportional to the distance squared from the radioactive source. The embodiments use GPS devices to calculate the distance to one or multiple known, possibly RFID tagged simulated radiation sources, to calculate the appropriate amount of simulated radiation at that distance for the simulated sources.

For training purposes, the use of simulated radiation sources is an improvement to using actual radiation sources. The distance from the simulated detector device, which can include an integrated GPS device, and the simulated radiation source can be calculated using the Haversine formula to find the simulated radiation at any distance. The use of GPS systems allows for the determination of the distance between the radioactive source and detector device, although other means of determining the distance between the simulated source and simulated detector can also be used. The system can calculate the amount of radiation that should be detected at that determined distance, and simulate the corresponding radiation meter output. Any RFID tagged source could be seen by the device to represent various levels of radiation events from small dirty bombs, to nuclear industry accidents, to full-scale nuclear attacks.

In certain embodiments, RFID tags can be configured to include a GPS receiver, or a GPS enabled device that is not integrated with the RFID tag can be used. It should be appreciated that the GPS enabled devices disclosed herein may comprise a GPS transceiver, GPS receiver, or a passive GPS enabled device, and this nomenclature should be understood to include all such embodiments throughout the description. The GPS device can be configured to receive its location from GPS satellites and can provide that information either directly to a GPS module 480 associated with the control board 605; or the location information can be provided to the RFID tag, which can transmit the location information to the RFID reader 470. Alternatively, a GPS device or transceiver can directly transmit the location information to the control board 605. These options have the advantage that, as the tag moves (for example, if it is hidden under moulage on an actor in the training environment), the location of the tag remains updated and the simulation is consistently accurate. The tag location can be updated at a prescribed interval, upon interrogation from the RFID detector, or before a scheduled signal transmission from the tag to the simulated detector. The simulated radiation detector can further comprise a transceiver 495 for communication to/from the simulated radiation detector to a central computer, and to other simulated radiation detectors.

GPS devices are also advantageous because they can include an extremely accurate time signal (which is generally used for improving location accuracy) that can be used to synchronize all of the devices for decay calculations (see following discussions). GPS devices also provide topographical information (e.g. elevation), that can be used to accurately simulate changing levels of radiation at different heights, for example within a multistory building, in a radiation shielded ground depression or basement, etc.

In another embodiment, the RFID tags and/or GPS enabled devices can be distributed in a training environment and the location of the tags (e.g. precise latitude, longitude, and elevation of the tag) can be logged and input into the simulated detection device. This can be accomplished using an on-board GPS receiver 475 associated with the detection device, or the locations can be manually collected (predetermined), and input into the processing system associated with the simulated radiation detector. One-way or two-way communications between RFID tags and/or GPS enabled devices, and the simulated radiation detector provide the necessary information to calculate the distance between detector and radiation source (RFID tags or predetermined latitude/longitude locations of simulated radiation).

In the case of any of these embodiments, the location of the tag is provided to the simulated radiation detector. The simulated radiation detector is also configured with a GPS module 475, preferably connected to the control board 605, so that the location of the simulated radiation detector is known at all times. With the location of both the RFID/GPS tags and the simulated radiation detector collected, the distance between the tag and the detector can be calculated.

In an embodiment, this distance between the simulated source and simulated detector can be determined using the Haversine formula, or other such calculation. In some cases, an approximation of the distance may be acceptable; in other cases, more robust distance calculations can be used for more accurate distance determinations, where more accurate modeling is required. Once the distance is determined, the control board can be equipped with instructions to modify the detected strength of the simulated radiation source to more accurately account for the distance separating the simulated source and simulated detector. The control board can further control the audio output, and simulated meter to display the simulated strength of the signal according to the distance to the simulated source.

In the embodiments disclosed herein radio shielding devices or structures such as structure 485 can be disposed in the test environment, or can be provided to trainees. In one embodiment, shielding devices can incorporate a radio wave shield that effectively stops or reduces the RFID signal, or other such signal, used in the embodiments disclosed herein (e.g. radio wave signal, GPS signal, satellite signal, etc.) in order to simulate radiation shielding that might be experienced in a real-world application.

One example of such shielding is a syringe radiation shield used in radio-pharmacy. This shield, which is made from lead metal, may be both a radiation shield (in real life) and an electromagnetic shield (in the simulation), which attenuates the RFID signal (or other such signal).

In other embodiments, the appearance of radiation shielding can be incorporated into the geographic map of the training exercise. In such embodiments, a measurement behind an object (e.g. a concrete wall) is attenuated in relation to a measurement in front (i.e. nearer to the radioactive source) of the wall. Other geographic or structural features in the training environment can likewise simulate radiation shielding. Examples include the inside of a building, hiding behind a vehicle, retreat to a bunker, a deep depression in the ground, etc. Such features can be identified in the simulated environment and can be programmed to provide simulated radiation attenuation. In this case, an internal map of the exercise, not an actual attenuation of a radio signal, determines the simulated radiation value.

In an additional embodiment, an internal clock 490 can be configured on the RFID/GPS tag and/or the simulated radiation detector. The half-life of a radioactive source is the time required for the radioactive material to decay to a quantity half its initial value. The term is commonly used in nuclear physics to describe radioactive decay. The half-life for various radioactive sources varies greatly, ranging from $10^{-24}$ seconds to $10^{+30}$ seconds (160 trillion times the estimated age of the universe).

The amount of the simulated radioactive material associated with one or more of the simulated radioactive sources (i.e. RFID tag, GPS devices, simulated areas on a map, etc.) can be initially calibrated to a set amount at time zero, which most often will equate with the beginning of a training exercise. In addition, the control board and/or simulated sources can be preprogrammed with half-life models so that the signal from the chip is adjusted according to the half-life of the modeled isotope. The internal clock can be used to allow the control board to simulate the decay of the radioactive material, and the associated reduction in the amount of detectable material, by monitoring the time. Specifically, the control board and/or simulated sources can be preprogrammed at initialization to be a specific simulated isotope with a specific half-life. As time passes, the quantity and detection level of the simulated radioactive source can be modified according to the reduced amount of the simulated radioactive material. This device also can model a plurality of isotopes with different half-lives, as may occur during a nuclear attack. It should be noted that clock 490 can be supplemented or replaced by the clock signal that is always present with the signal from the GPS enabled equipment.

While, the embodiments disclosed herein provide a useful training method, it would be advantageous to provide a larger scale environment for training exercises. It has become increasingly possible to very accurately model the distribution of radiation after a nuclear event with a computer.

In the embodiments disclosed herein, one or more simulated radiation detectors 1205, 1210, and 1215 can be configured with RFID readers, GPS capabilities, and/or can be connected with a computer system 1220, which is configured to produce a simulation with a simulation or emulation module 1225, in order to provide a training exercise with training module 1240. The emulating module 1225 can be configured to simulate a detection level for simulated radioactive sources according to a radiation level associated with the simulated radioactive sources and/or the location of the sources and/or detector according to a simulation. The emulating module 1225 can adjust the detection level according to the distance between the simulated radioactive source and the simulated radiation detector, or according to the location of the detector and the associated simulation. The simulated detection level can be provided to the user on the simulated radiation detector.

In one non-limiting example, US patent application 2014/0323157, titled "Systems and Methods for Hazardous Material Simulations and Games using Internet-connected Mobile Devices," describes methods simulating a source, in the context of gaming. US patent application 2014/0323157 is herein incorporated by reference in its entirety. It should be appreciated that his represents one example of a simulation method for gaming. Other simulation methods can be implemented in accordance with the disclosed embodiments.

Central to such embodiments, is a map of the training area, where simulated radiation has been (or is being) released. This map can be a specific region where a training exercise will take place. The map can evolve over time. In some embodiments, the map and associated simulation, can be modified over time according to a pre-set script of events (e.g. release of a dirty bomb, followed by a shift in weather conditions). In other cases, some or all of the variables associated with the exercise can be taken from the real world, in real time so that trainees are experiencing the actual real-world conditions being simulated (e.g. when a trainee at a given location in the real-world experiences a change in wind direction and speed, the variables associated with the simulation can be updated in real time to match the real-world conditions at that location and simulate radiation level distribution accordingly. In some embodiments variables that can affect the simulation include a location, a type of nuclear event, a type of radioactive material, an amount of radioactive material, a time of said training exercise, a size of said nuclear event, nuclear decay characteristics of various isotopes, shielded locations and their shielding factors, one or more weather characteristics, a model of fallout characteristics, a model of high lethality locations, a model of shielding for various geographic characteristics, a model of shielding for various structural objects, a model of shielding for various physical objects, evolution of characteristics with time, and a geographic map of event variables for each location Emulating module 1225 can provide an simulation data to a training module 1240 that emulates an event resulting in the release of radioactive material in a pre-defined area, for example, simulating a real or fictitious nuclear attack on a city. The computer can run the simulation by modeling the radioactive levels on the map of the real-world location according to the variables described above, and any other relevant variables. The simulation can account for environmental conditions such as wind, rain, etc. to assign one, or multiple, radiation levels 1230 to one or many places in a selected geographical region of the exercise map 1235. The computer can further update the simulation temporally so that the level of radiation at a given location changes over time according to the model of the release of radioactive material being used.

For example, the simulation can be configured to emulate a nuclear attack on a city. In such a case, the distribution of radiation levels can be determined for various locations (or all locations) in the city. One or more trainees can then travel throughout the city with a simulated radiation detector. The location of the simulated radiation detector can be collected by the GPS module associated with the radiation detector and provided to the computer system. The computer system can then provide the simulated radiation detector with a simulated radiation level at the location of the simulated radiation detector, according to the simulated radiation level at that location. It should be understood that in such embodiments, the simulated radiation detector can include a communications module configured to communicate with a central computer system, and to other remote radiation simulation devices. As the trainees move throughout the city, the simulated radiation detectors can be updated in real-time to provide the trainees the experience of changing radiation levels associated with various scenarios.

In alternative embodiments, the computing system in the simulated radiation detector can be preloaded with the simulated radiological event so that no external computer system is required.

Thus, various embodiments of the disclosed simulation are provided. In one embodiment, the GPS enabled simulated radiation detector can be used alone (i.e. without RFID tags or a central computer system). In such an embodiment, the control board of the simulated radiation detector is loaded with an internal map of the exercise, and the model of the simulated event. In this embodiment, the trainee equipped with the simulated radiation detector, can travel in the real-world, and the simulated radiation device will provide simulated radiation level readings based on the location of the trainee (and the simulated detector) according to the model of the simulated event. In this embodiment, the simulated radiation detectors can be networked such that the information from one simulated radiation detector can be communicated to another so that trainees can communicate and/or share data, in order to facilitate team training.

In another embodiment, the GPS enabled simulated radiation detector can be further connected to a central computer. In such an embodiment the exercise map and event model are stored on, and executed by the central computer. Note that, in such an embodiment, RFID tags are not required (but may optionally be included) because the event map, event model, and simulation are stored in, and executed by, the central computer. In such an embodiment, the central computer provides simulated radiation level readings to the GPS enabled simulated radiation detector according to the simulated radiation level at the device's location. Again, the simulated radiation detectors can be networked with one another and with the central computer such that the information from the central computer and/or one simulated radiation detector can be communicated between trainees so that trainees can communicate and/or share data, in order to facilitate team training.

In another embodiment the training exercise can make use of RFID tags and GPS enabled devices. In some cases, the GPS capability can be integrated with the RFID tag. In other embodiments, the GPS functionality and RFID tag can be housed in a single unit that can further include a transceiver, such that the unit can communicate with one or more simulated radiation detectors and one or more central computing devices as detailed herein. Thus, in some embodiments there can be transceiver communication between some or all detectors and/or the central computer. In other embodiments the exercise can be synchronized in time, with little or no communication between devices.

FIGS. 13-16 provide exemplary plume diagrams associated with the simulations described herein. More specifically, FIGS. 13-16 illustrate geographic maps with superimposed radiation levels assigned according to a simulation of a radioactive event. These diagrams are intended to be illustrative of a temporally dynamic simulation as disclosed herein.

Figure 13:
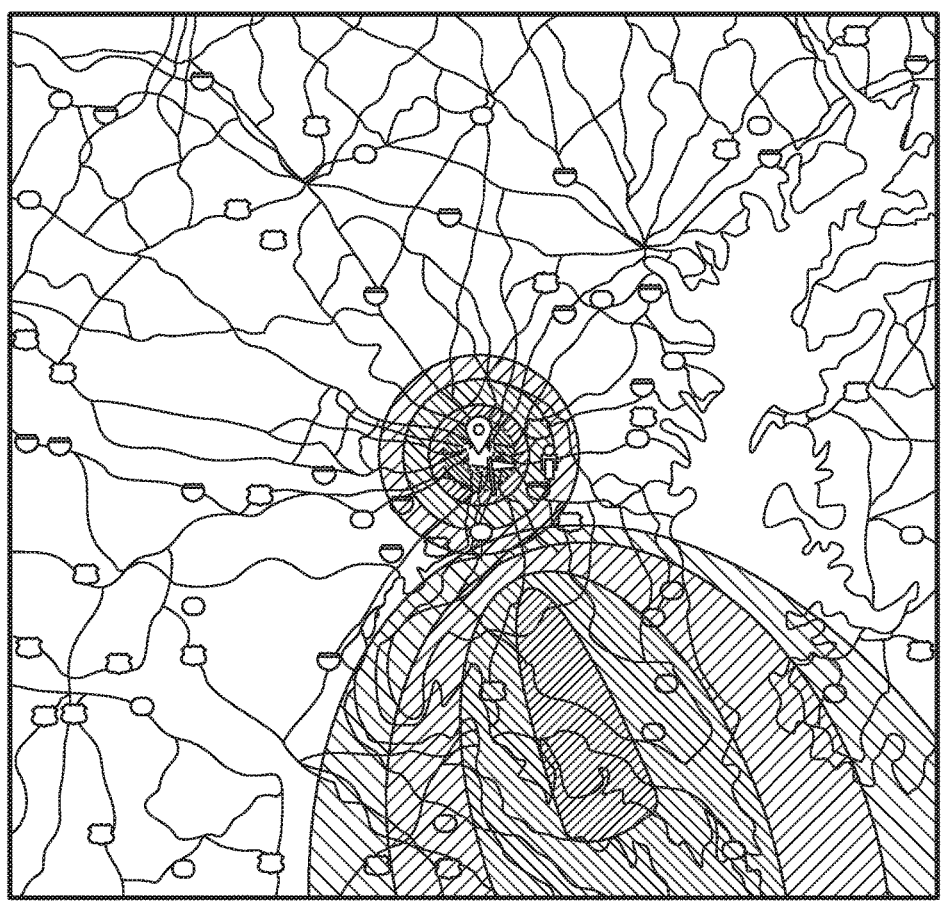
FIG. 13 depicts an exemplary simulated "heat map" of radioactive fallout in accordance with the disclosed embodiments.
Figure 14:
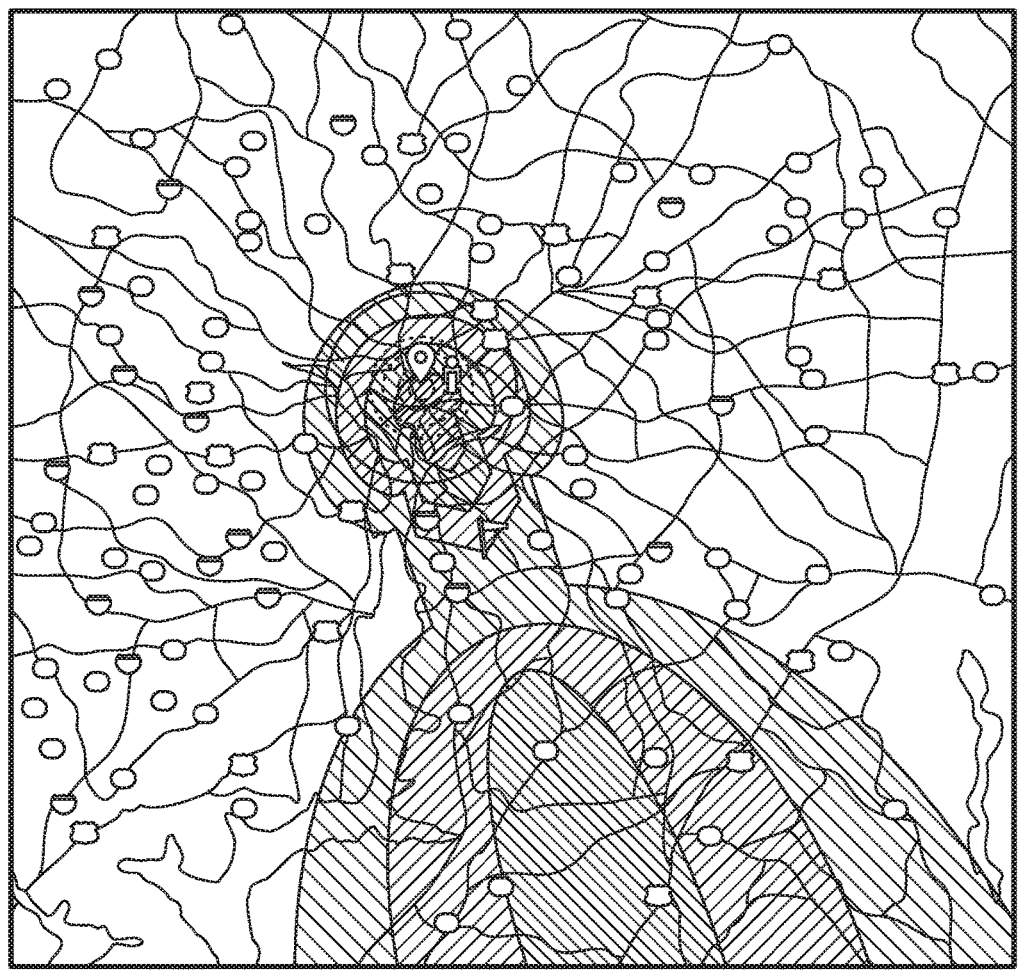
FIG. 14 depicts an exemplary simulated "heat map" of radioactive fallout in accordance with the disclosed embodiments.

FIG. 13 illustrates a map of a metro area with a simulated attack on the metro area using the current Chinese Dong Feng 5, a 5 megaton warhead. Varying radiation levels are superimposed on the map according to the simulated attack. FIG. 14 illustrates a similar diagram of varying radiation levels superimposed on a map according to a simulation of a high-end estimation of the North Korean test on 3 Sep. 2017 (~100+/−50 kT).

Figure 15:
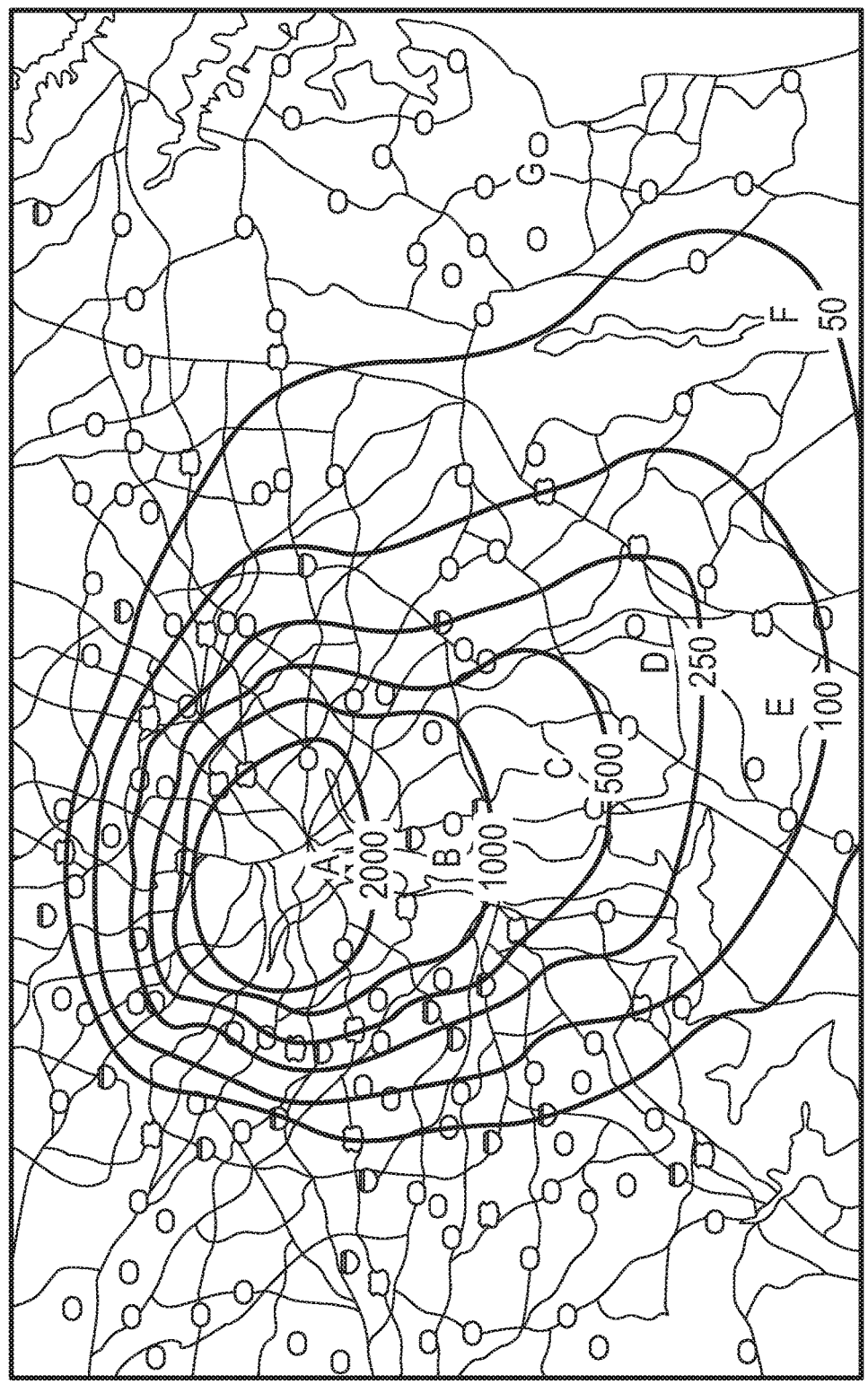
FIG. 15 depicts a temporal illustration of simulated radiation levels in accordance with the disclosed embodiments.
Figure 16:
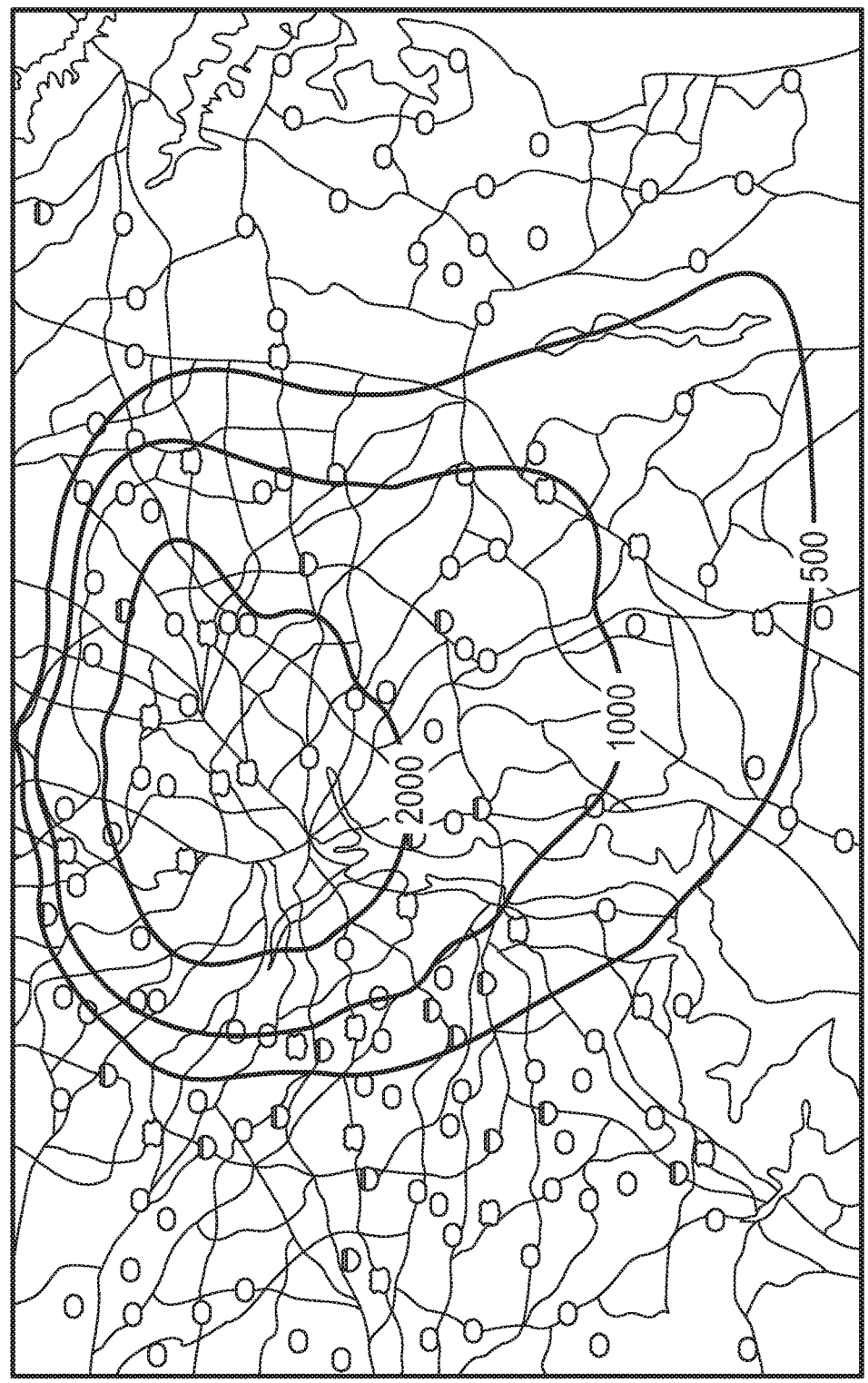
FIG. 16 depicts a temporal illustration of simulated radiation levels in accordance with the disclosed embodiments.

FIGS. 15 and 16 illustrate the distribution of nuclear fallout on a map, as an example of a simulation as disclosed herein, at two different times. FIG. 15 illustrates fallout levels at various locations on the map at a first time and FIG. 16 illustrates fallout levels at various locations on the map at a later time. Reference zone A is more than 2000 R/hr, reference zone B is 1000-2000 R/hr, reference zone C is 500-1000 R/hr, reference zone D is 250-500 R/hr, reference zone E is 100-250 R/hr, reference zone F 50-100 R/hr, and reference zone G less than 50 R/hr. At a dose of ~500 R total, 50% of population will die within 60 days (this is called the "LD50, 60" which is the lethal dose for 50% of population at 60 days) if they do not receive advanced medical treatment. Therefore, many people in zones A-F in the illustrated simulation will likely die in the next 2 months (reference zone F has 5-10 hrs to escape the zone before they receive the lethal dose 50%, 60 d—they probably will not be able to do this due to infrastructure damage). In FIGS. 15 and 16 all units are in R/hr (Roentgens/hr), which for gamma and beta particles are the same as Rads/hr and Rem/hr. The idea is that any radiation plume, and it's time evolution, can be modeled, along with decay of one or multiple radio-isotopes over time according to the methods and systems disclosed herein.

Figure 17:
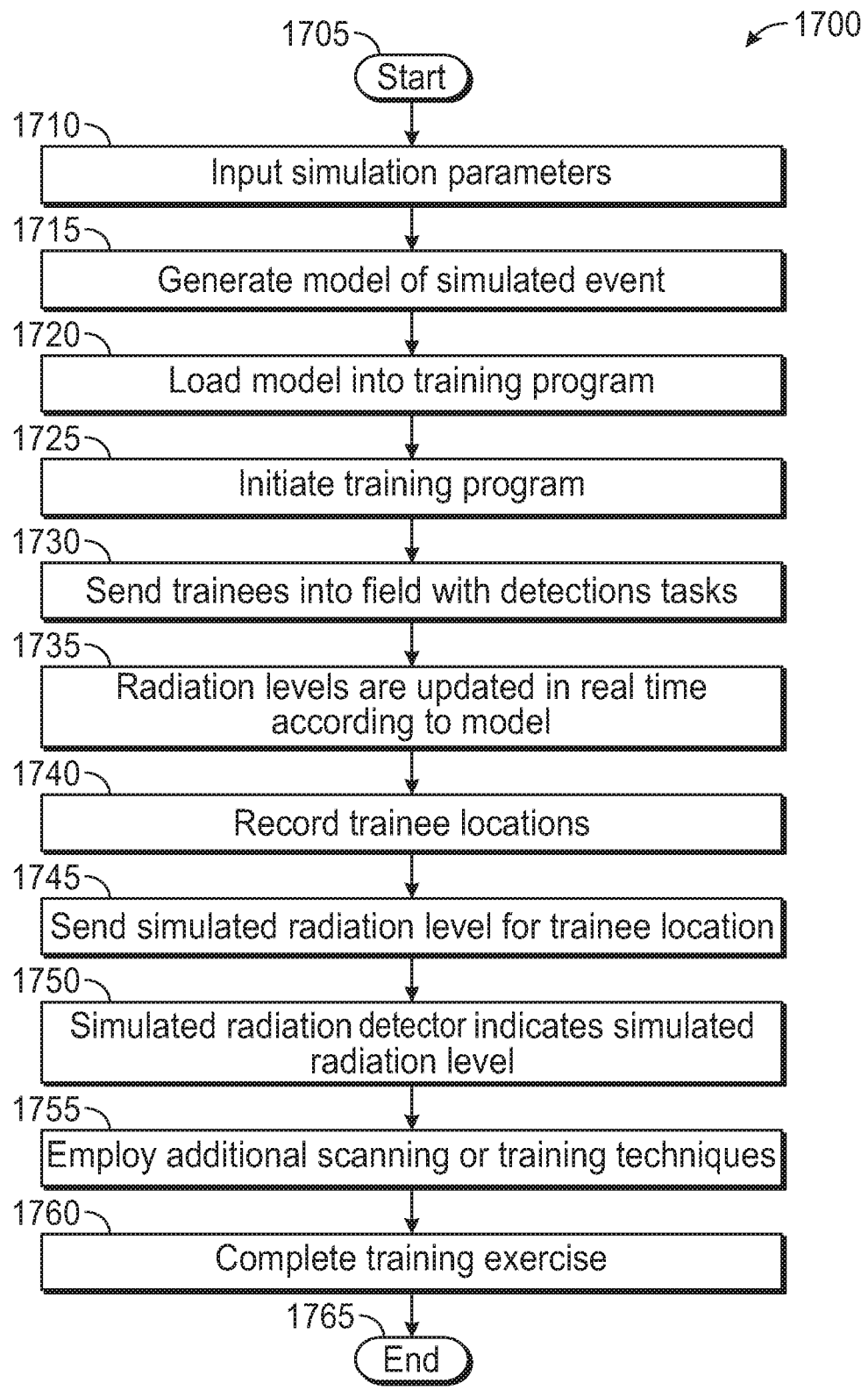
FIG. 17 depicts steps associated with a method for training for the detection of radiation in accordance with the disclosed embodiments.

FIG. 17 illustrates a method 1700 for training subjects to test for radiation using simulated radiation distribution simulations according to the embodiments disclosed herein. The method begins at 1705.

At block 1710 various parameters associated with an event causing the release of radioactive material can be provided to a radiation modeling module, including wind speed and direction, initial incident parameters including event type, amount of time that training will require, amount of simulated released radiation, types of radioactive materials involved, location of event, time of year, weather conditions, the boundaries and shielding factor for shielded locations etc. The simulated distribution of radioactive material can then be modeled as shown at 1715. The simulated distribution can be based on a previous real world event, or a fictitious event for purposes of training. At 1720, the model can be loaded into a training module, or can be provided to simulated radiation detector. The simulated radiation detector can be equipped with an RFID/GPS module configured to provide the location of the simulated radiation detector. At 1725, the training program can be initiated and the training exercise can begin.

Trainees, equipped with simulated radiation detectors can be provided specific tasks or objectives, and/or instructed to take simulated radiation measurements as shown at 1730. The training module can update in real time with new radiation levels at various location as determined by the modeling module as illustrated at 1735. Trainees' locations can be provided to the training module at predetermined intervals, and/or each time the trainee takes a simulated radiation reading as shown at 1740. The training module can determine the simulated radiation level at the trainees' location and send the simulated radiation level to the simulated radiation detector at 1745. The simulated radiation detector can process the simulated radiation level and generate an output, including an auditory output, meter reading, etc. that indicates the simulated radiation level at that location at 1750.

It should further be appreciated that the various systems and methods disclosed herein can be incorporated with this method. For example, as shown at 1755 a radiation portal can be provided at a given location and protocol associated with sending simulated contamination victims, from contaminated regions, through the portal and/or conducting hand sweeps of people during the exercise can be included in the training. At 1760 the training exercise can be completed and the method ends at 1765.

Based on the foregoing, it can be appreciated that a number of embodiments, preferred and alternative, are disclosed herein. It should be appreciated that variations of the above-disclosed and other features and functions, or alternatives thereof, may be desirably combined into many other different systems or applications. For example, in an embodiment a system for simulating the detection of radiation comprises at least one simulated radioactive source, a simulated radiation detector, and an emulating module configured to simulate a detection level for the at least one simulated radioactive source according to a radiation level associated with the simulated radioactive source, wherein the simulated detection level is provided on the simulated radiation detector.

In an embodiment, the emulating module adjusts the detection level according to a distance between the simulated radioactive source and the simulated radiation detector. In an embodiment, distance between the simulated radioactive source and the simulated radiation detector is determined according to a signal field strength of a signal provided by the simulated radioactive source.

In an embodiment, the simulated radioactive source comprises at least one of: a GPS enabled RFID tag, an RFID tag, and a GPS enabled device. In an embodiment, the simulated radiation detector comprises: a simulated radiation detector housing, a control board configured in the housing, a GPS module connected to the control board, an RFID module connected to the control board, a transceiver connected to the control board wherein the transceiver is configured to provide one of one-way and two-way communication between the simulated radiation detector and a central computer, at least one simulated radiation gauge operably connected to the emulating module, and at least one simulated radiation sound producing device operably connected to the emulating module.

In an embodiment, the at least one GPS enabled RFID tag is preprogrammed with a simulated radiation level, the simulated radiation level being provided to the emulating module. In an embodiment, the emulating module provides an output indicative of the simulated radiation level associated with the at least one GPS enabled RFID tag according to at least one of an original simulated radiation level associated with the GPS enabled RFID tag, a half-life associated with the simulated radioactive source, a time of decay associated with the simulated radioactive source, and a distance between the GPS enabled RFID tag and the simulated radiation detector.

In an embodiment, a location of the at least one simulated radiation source is provided to the simulated radiation detector.

In an embodiment, the simulated radiation detector housing comprises a radiation survey meter.

In an embodiment, the emulating module comprises a circuit comprising: an RFID detector device, logic to process signals received from the at least one simulated radioactive source, and an output to emulate the detection of a radioactive source.

In another embodiment a radiation detection training method comprises generating a model of an event, recording a location of at least one simulated radiation detector, determining a simulated radiation level for the location of the at least one simulated radiation detector, and providing an output signal simulating the simulated radiation level at the location of the simulated radiation detector.

In an embodiment, generating a model of an event further comprises assigning one or more simulation parameters of the event.

In an embodiment, the simulated parameters comprise at least one of: a location, a type of nuclear event, a type of radioactive material, an amount of radioactive material, a time of a training exercise, a size of the nuclear event, nuclear decay characteristics of various isotopes, at least one shielded location and its shielding factor, one or more weather characteristics, a model of fallout characteristics, a model of high lethality locations, a model of shielding for various geographic characteristics, a model of shielding for various structural objects, a model of shielding for various physical objects, an evolution of characteristics with time, and a map of event variables for each location.

In an embodiment, the output further comprises: at least one simulated radiation reading provided on at least one simulated radiation gauge and at least one simulated auditory response provided on at least one simulated radiation sound producing device.

In yet another embodiment a system for simulating the detection of radiation comprises at least one simulated radioactive source, a simulated radiation detector portal, and an emulating module for receiving signals from the at least one simulated radioactive source and providing an output signal simulating detection of a radioactive source.

In an embodiment, the at least one simulated radioactive source comprises an RFID tag preprogrammed with a simulated radiation level, the simulated radiation level being provided to the emulating module.

In an embodiment, the emulating module provides an output indicative of the simulated radiation level associated with the at least one RFID tag.

In an embodiment, the simulated radiation detector portal comprises a simulated radiation detector gate, at least one simulated radiation gauge operably connected to the emulating module, and at least one simulated radiation sound producing device operably connected to the emulating module.

In an embodiment the system further comprises a processing system configured to model a radiation distribution event and provide a training exercise for a predefined map and at least one simulated radiation detector comprising a control board and at least one of: a GPS enabled device, an RFID enabled device, and a transceiver, wherein a location of the at least one simulated radiation detector is provided to the central computer and a simulated radiation level is provided to the at least one simulated radiation detector according to the model of radiation distribution and the location of the at least one simulated radiation detector.

In an embodiment, the processing system comprises one of a central computer system, and a computing system configured in the at least one simulated radiation detector.

It should be understood that various presently unforeseen or unanticipated alternatives, modifications, variations or improvements therein may be subsequently made by those skilled in the art which are also intended to be encompassed by the following claims.

What is claimed is:

1. A system for simulating the detection of radiation comprising:
    at least one simulated radioactive source comprising a GPS enabled RFID tag preprogrammed with a simulated radiation level;
    a simulated radiation detector; and
    an emulating module configured to simulate a detection level for said at least one simulated radioactive source according to a radiation level associated with said simulated radioactive source, wherein said simulated detection level is provided on said simulated radiation detector.

2. The system of claim 1 wherein said emulating module adjusts said detection level according to a distance between said simulated radioactive source and said simulated radiation detector.

3. The system of claim 2 wherein said distance between said simulated radioactive source and said simulated radiation detector is determined according to a signal field strength of a signal provided by said simulated radioactive source.

4. The system of claim 1 wherein said simulated radiation detector comprises:
a simulated radiation detector housing;
a control board configured in said housing;
a GPS module connected to said control board;
an RFID module connected to said control board;
a transceiver connected to said control board wherein said transceiver is configured to provide one of one-way and two-way communication between said simulated radiation detector and a central computer;
at least one simulated radiation gauge operably connected to said emulating module; and
at least one simulated radiation sound producing device operably connected to said emulating module.

5. The system of claim 4 wherein said simulated radiation detector housing comprises a radiation survey meter.

6. The system of claim 1 wherein an output indicative of said simulated radiation level associated with said at least one GPS enabled RFID tag is provided according to at least one of:
an original simulated radiation level associated with said GPS enabled RFID tag;
a half-life associated with said simulated radioactive source;
a time of decay associated with said simulated radioactive source; and
a distance between said GPS enabled RFID tag and said simulated radiation detector.

7. The system of claim 1 wherein a location of said at least one simulated radiation source is provided to said simulated radiation detector.

8. The system of claim 1 wherein said emulating module comprises a circuit comprising:
an RFID detector device;
logic to process signals received from said at least one simulated radioactive source; and
an output to emulate the detection of a radioactive source.

9. A radiation detection training method comprising:
generating a model, with a computer system, simulating a radioactive event;
recording a location of at least one simulated radiation detector;
determining a simulated radiation level for said location of said at least one simulated radiation detector according to said model simulating said radioactive event; and
providing an output comprising said simulated radiation level at said location of said simulated radiation detector.

10. The method of claim 9 wherein generating a model simulating a radioactive event further comprises:
assigning one or more simulation parameters associated with said model simulating said radioactive event.

11. The method of claim 10 wherein said simulated parameters comprise at least one of:
a location;
a type of nuclear event;
a type of radioactive material;
an amount of radioactive material;
a time of a training exercise;
a size of said nuclear event;
nuclear decay characteristics of various isotopes;
at least one shielded location and its shielding factor;
one or more weather characteristics;
a model of fallout characteristics;
a model of high lethality locations;
a model of shielding for various geographic characteristics;
a model of shielding for various structural objects;
a model of shielding for various physical objects;
an evolution of characteristics with time; and
a map of event variables for each location.

12. The method of claim 11 wherein said output further comprises:
at least one simulated radiation reading provided on at least one simulated radiation gauge; and
at least one simulated auditory response provided on at least one simulated radiation sound producing device.

13. A system for simulating the detection of radiation comprising:
at least one simulated radioactive source;
a simulated radiation detector portal; and
an emulating module for receiving signals from said at least one simulated radioactive source and providing an output signal simulating detection of a radioactive source when said simulated radioactive source passes through said radiation detector portal.

14. The system of claim 13 wherein said at least one simulated radioactive source comprises an RFID tag preprogrammed with a simulated radiation level.

15. The system of claim 14 wherein said emulating module provides an output indicative of said simulated radiation level associated with said at least one RFID tag.

16. The system of claim 13 wherein said simulated radiation detector portal comprises:
a simulated radiation detector gate;
at least one simulated radiation gauge operably connected to said emulating module; and
at least one simulated radiation sound producing device operably connected to said emulating module.

17. The system of claim 13 further comprising:
a processing system configured to model a radiation distribution event and provide a training exercise for a predefined map; and
at least one simulated radiation detector comprising a control board, and at least one of:
a GPS enabled device;
an RFID enabled device; and
a transceiver;
wherein a location of said at least one simulated radiation detector is provided to said processing system and a simulated radiation level is provided to said at least one simulated radiation detector according to said model of said radiation distribution event and said location of said at least one simulated radiation detector.

18. The system of claim 17 wherein said processing system comprises one of:
a central computer system; and
a computing system configured in said at least one simulated radiation detector.

* * * * *